(12) United States Patent
Kim et al.

(10) Patent No.: US 12,265,425 B2
(45) Date of Patent: Apr. 1, 2025

(54) FOLDABLE WINDOW, DISPLAY DEVICE INCLUDING THE SAME, AND A METHOD OF MANUFACTURING THE WINDOW

(71) Applicant: Samsung Display Co., Ltd., Yongin-Si (KR)

(72) Inventors: Sunghoon Kim, Asan-si (KR); Yuri Kim, Guri-si (KR); Kang-Woo Lee, Seoul (KR); Seongjin Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/238,651

(22) Filed: Aug. 28, 2023

(65) Prior Publication Data

US 2023/0400883 A1 Dec. 14, 2023

Related U.S. Application Data

(63) Continuation of application No. 17/672,919, filed on Feb. 16, 2022, now Pat. No. 11,768,520.

(30) Foreign Application Priority Data

May 20, 2021 (KR) .......................... 10-2021-0065003

(51) Int. Cl.
*G06F 1/16* (2006.01)
*H04M 1/02* (2006.01)

(52) U.S. Cl.
CPC .......... *G06F 1/1652* (2013.01); *G06F 1/1641* (2013.01); *H04M 1/0268* (2013.01)

(58) Field of Classification Search
CPC .................................................. H04M 1/0268
See application file for complete search history.

(56) References Cited

U.S. PATENT DOCUMENTS 8,591,753 B2   11/2013   Shimoi et al.
8,845,916 B2   9/2014    Shin et al.
(Continued)

FOREIGN PATENT DOCUMENTS

KR    10-2008-0096158    10/2008
KR      10-0969473        7/2010
(Continued)

OTHER PUBLICATIONS

Sungil Kim et al., "Optimization of selective laser-induced etching (SLE) for fabrication of 3D glass microfluidic device with multi-layer micro channels", Micro and Nano Systems Letters vol. 7, No. 15 (2019) (https://doi.org/10.1186/s40486-019-0094-5), pp. 1-7.
(Continued)

*Primary Examiner* — Lisa Lea-Edmonds
(74) *Attorney, Agent, or Firm* — F. CHAU & ASSOCIATES, LLC

(57) ABSTRACT

A window includes a substrate including a folding area folded about an imaginary folding axis and a non-folding area and including an upper surface and a lower surface and a plurality of groove patterns arranged in the folding area along a first direction crossing the folding axis. Each of the groove patterns includes a bottom surface recessed from the upper surface and substantially parallel to the upper surface and a side surface connecting the bottom surface and the upper surface. The side surface includes at least one curved surface.

19 Claims, 32 Drawing Sheets

(56) References Cited

U.S. PATENT DOCUMENTS

| | | | |
|---|---|---|---|
| 9,209,420 | B2 | 12/2015 | Han et al. |
| 9,354,476 | B2 | 5/2016 | Han et al. |
| 10,104,790 | B2 | 10/2018 | Lee et al. |
| 10,216,230 | B2 | 2/2019 | Kim et al. |
| 10,314,184 | B2 | 6/2019 | Choi et al. |
| 10,930,883 | B2 | 2/2021 | Park |
| 10,948,630 | B2 | 3/2021 | Kim et al. |
| 11,320,866 | B2 | 5/2022 | Sunwoo et al. |
| 11,347,269 | B2 | 5/2022 | Yug et al. |
| 11,409,325 | B2 | 8/2022 | Yee et al. |
| 11,470,734 | B2 * | 10/2022 | Sim .................. H05K 5/0217 |
| 11,474,561 | B2 * | 10/2022 | Kim .................. G06F 1/1637 |
| 11,550,365 | B2 | 1/2023 | Kim et al. |
| 11,615,720 | B2 * | 3/2023 | Park .................. G06F 1/1652 |
| | | | 361/679.01 |
| 11,625,073 | B2 | 4/2023 | Shim et al. |
| 11,768,520 | B2 * | 9/2023 | Kim .................. H04M 1/0214 |
| | | | 361/679.56 |
| 11,812,566 | B2 * | 11/2023 | Sim .................. H04M 1/0216 |
| 11,822,384 | B2 * | 11/2023 | Lee .................. G06F 1/1652 |
| 11,886,243 | B2 * | 1/2024 | Lee .................. H04M 1/022 |
| 11,977,409 | B2 * | 5/2024 | Min .................. G06F 1/1641 |
| 11,985,774 | B2 * | 5/2024 | Shin .................. G02F 1/133305 |
| 11,995,273 | B2 * | 5/2024 | Sim .................. G06F 3/042 |
| 12,004,408 | B2 * | 6/2024 | Shin .................. H10K 50/87 |
| 12,019,471 | B2 * | 6/2024 | Kim .................. G06F 1/1652 |
| 2017/0155084 | A1 | 6/2017 | Park et al. |
| 2018/0149793 | A1 | 5/2018 | Gollier et al. |
| 2018/0329460 | A1 | 11/2018 | Song |
| 2019/0131553 | A1 | 5/2019 | Park et al. |
| 2019/0138059 | A1 | 5/2019 | Choi et al. |
| 2020/0009691 | A1 | 1/2020 | Ostholt et al. |
| 2020/0159369 | A1 | 5/2020 | Seo et al. |
| 2021/0132740 | A1 | 5/2021 | Seo et al. |
| 2022/0011813 | A1 | 1/2022 | Kim et al. |
| 2022/0043187 | A1 | 2/2022 | Choi et al. |
| 2022/0098097 | A1 | 3/2022 | Lee et al. |
| 2022/0256018 | A1 | 8/2022 | Kim et al. |
| 2022/0374046 | A1 * | 11/2022 | Kim .................. G06F 1/1652 |
| 2023/0006171 | A1 | 1/2023 | Choi et al. |
| 2023/0032676 | A1 * | 2/2023 | Kim .................. G06F 1/1616 |
| 2023/0037245 | A1 * | 2/2023 | Sim .................. H05K 5/0017 |
| 2023/0044853 | A1 | 2/2023 | Park et al. |
| 2023/0048213 | A1 | 2/2023 | Goo et al. |
| 2023/0078056 | A1 | 3/2023 | Lee et al. |
| 2023/0126630 | A1 | 4/2023 | Park |
| 2023/0239384 | A1 * | 7/2023 | Lim .................. G06F 1/1656 |
| | | | 361/679.01 |
| 2023/0400883 | A1 * | 12/2023 | Kim .................. G06F 1/1641 |
| 2024/0081007 | A1 * | 3/2024 | Sim .................. G06F 1/1641 |

FOREIGN PATENT DOCUMENTS

| | | |
|---|---|---|
| KR | 10-2013-0088146 A | 8/2013 |
| KR | 10-2015-0017819 | 2/2015 |
| KR | 10-2018-0008723 | 1/2018 |
| KR | 10-2018-0018925 A | 2/2018 |
| KR | 10-2018-0057814 A | 5/2018 |
| KR | 10-2019-0116378 | 10/2019 |
| KR | 10-2056314 | 12/2019 |
| KR | 10-2146730 B1 | 8/2020 |
| KR | 10-2022-0006672 | 1/2022 |

OTHER PUBLICATIONS

Wansun Kim et al., Controlled multiple neutral planes by low elastic modulus adhesive for flexible organic photovoltaics, Nanotechnology 28 (2017) 194002 (9pp).

* cited by examiner

FOLDABLE WINDOW, DISPLAY DEVICE INCLUDING THE SAME, AND A METHOD OF MANUFACTURING THE WINDOW

TECHNICAL FIELD

The present disclosure relates to a window, a display device including the same, and a method of manufacturing the same. More particularly, the present disclosure relates to a foldable window, a display device including the window, and a method of manufacturing the window.

BACKGROUND ART

A display device that provides images to a user is applied to various multimedia devices, such as a television set, a mobile phone, a tablet computer, a game unit, etc. In recent years, various types of flexible display devices that are foldable or bendable are being developed. Since the shape of the flexible display device is able to be changed in various ways, e.g., being folded, rolled, or bent, the flexible display devices are easy to carry.

The flexible display device includes a display panel and a window, which are foldable or bendable. However, the window of the flexible display device is deformed due to a folding or bending operation or is easily damaged by external impacts.

SUMMARY OF INVENTION

Technical Problem

The purpose of the present disclosure is to provide a window having improved reliability and methode of manufacturing the window.

The purpose of the present disclosure is to provide a window having excellent folding and mechanical properties and methode of manufacturing the window.

Solution to Problem

Embodiments of the inventive concept provide a window including a substrate including a folding area folded about an imaginary folding axis and a non-folding area and including an upper surface and a lower surface and a plurality of groove patterns arranged in the folding area along a first direction crossing the folding axis. Each of the groove patterns includes a bottom surface recessed from the upper surface and substantially parallel to the upper surface and a side surface connecting the bottom surface and the upper surface. The side surface includes at least one curved surface.

When the substrate is in a non-folded state, the side surface of the groove patterns includes a first surface and a second surface facing the first surface and more spaced apart from the folding axis in the first direction than the first surface is. The first surface is inclined at a first angle with respect to the bottom surface, the second surface is inclined at a second angle with respect to the bottom surface, and each of the first angle and the second angle is equal to or greater than about 90 degrees and equal to or smaller than about 140 degrees.

The first angles of the groove patterns are the same as each other.

The first angles of the groove patterns are different from each other.

The second angles of the groove patterns are the same as the first angles respectively facing the second angles.

At least some angles of the second angles of the groove patterns are different from the first angles respectively facing the second angles.

The second angle of the groove patterns decreases as a distance from the folding axis decreases.

Thicknesses from the lower surface to the bottom surface of the groove patterns in a cross-section are the same as each other.

Thicknesses from the lower surface to the bottom surface of the groove patterns in a cross-section are equal to or greater than about 1 μm and equal to or smaller than about 30 μm.

The bottom surface has a width equal to or greater than about 40 μm.

The groove patterns are symmetrical with respect to the folding axis.

The groove patterns include mesh patterns crossing each other.

The lower surface of the substrate faces the folding axis in a state where the substrate is folded.

The window further includes a filling member filled in the groove patterns.

Embodiments of the inventive concept provide a display device including a display module that is foldable and a window disposed on the display module and folded with the display module. The window includes a substrate including a folding area folded about an imaginary folding axis and a non-folding area and including an upper surface and a lower surface and a plurality of groove patterns arranged in the folding area along one direction crossing the folding axis. Each of the groove patterns includes a bottom surface recessed from the upper surface and substantially parallel to the upper surface and a side surface connecting the bottom surface and the upper surface. The side surface includes at least one curved surface.

Embodiments of the inventive concept provide a method of manufacturing a window. The method includes providing a mother substrate in which a first line extending in a first direction is defined to form a first groove pattern and forming the first groove pattern in some areas of the mother substrate. The forming of the first groove pattern includes irradiating a first laser beam onto first portions overlapping the first line toward a thickness direction of the mother substrate and providing an alkaline solution onto the first portions to etch the first portions. A refractive index of the first portions irradiated with the first laser beam is different from a refractive index of the mother substrate before the first laser beam is irradiated, and the first portions irradiated with the first laser beam have a thickness smaller than a thickness of the mother substrate.

The method further includes forming a second groove pattern. The forming of the second groove pattern includes defining a second line spaced apart from the first line and extending in the first direction on the mother substrate to form the second groove pattern, irradiating a second laser beam onto second portions overlapping the second line and third portions spaced apart from the second portions in a second direction crossing the first direction, and providing the alkaline solution onto the second portions and the third portions to etch the second portions and the third portions. The second and third portions irradiated with the second laser beam have a refractive index different from the refractive index of the mother substrate, the second and third portions irradiated with the second laser beam have a thickness smaller than the thickness of the mother substrate, and the second groove pattern has a width greater than a width of the first groove pattern in the second direction.

The thickness of the second portions is the same as the thickness of the third portions. The thickness of the second portions is different from the thickness of the third portions.

The alkaline solution has a temperature equal to or greater than about 100 Celsius degrees and equal to or smaller than about 150 Celsius degrees.

Advantageous Effect of Invention

According to the above, a folding property and an impact resistance of the window are improved.

According to the above, a reliability of the display device including the window is improved. A phenomenon that interference fringes caused by the display module and the window are seen is prevented in the display device including the window.

According to the above, the window having improved folding property and impact resistance is manufactured by the window manufacturing method.

DESCRIPTION OF EMBODIMENTS

Figure 1:
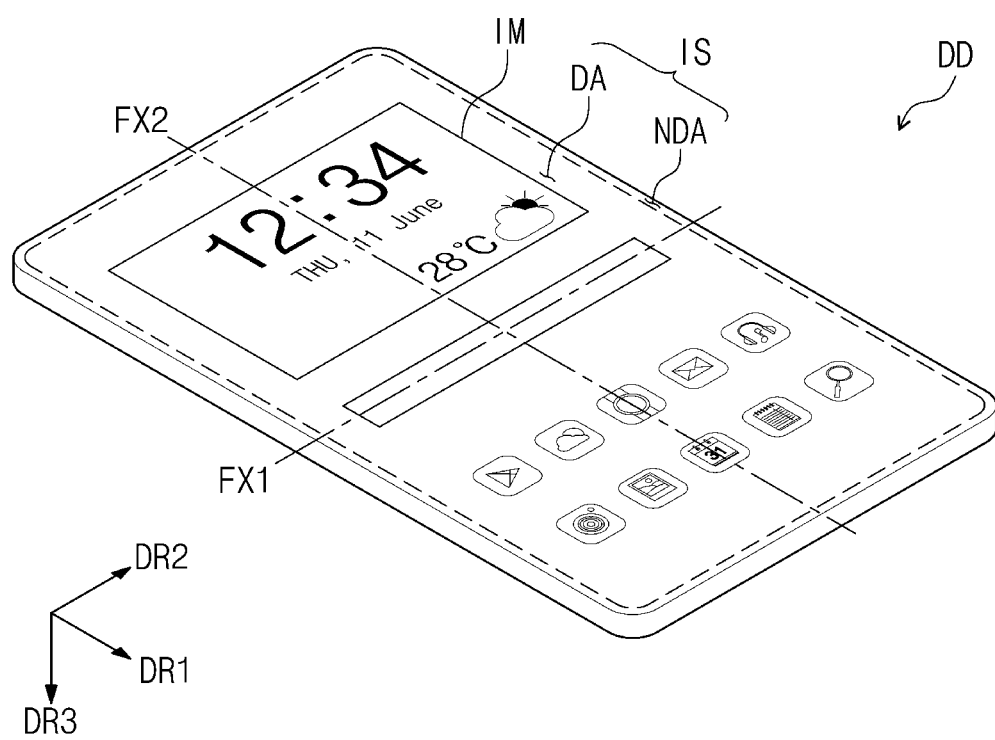
FIG. 1 is a perspective view showing a non-folded state of a display device according to an embodiment of the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

In the present disclosure, it will be understood that when an element or layer is referred to as being "on", "connected to" or "coupled to" another element or layer, it can be directly on, connected or coupled to the other element or layer of intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a window, a display device including the window, and a method of manufacturing the window will be explained in detail with reference to the accompanying drawings.

FIG. 1 is a perspective view showing a non-folded state of a display device DD according to an embodiment of the present disclosure. FIGS. 2A to 2D are perspective views showing a folded state of the display device DD shown in FIG. 1.

The display device DD may be activated in response to electrical signals to provide an image IM. The display device DD may be applied to a variety of electronic devices to display the image IM. As an example, the display device DD may be applied to a large-sized electronic item, such as a television set, a monitor, etc., and a small and medium-sized electronic item, such as a mobile phone, a tablet computer, a car navigation unit, a game unit, etc., but it should not be limited thereto or thereby. The display device DD may be applied to other electronic devices as long as they do not depart from the concept of the present disclosure.

Referring to FIG. 1, a front surface of the display device DD may be defined as a display surface IS. In the non-folded state, the display surface IS of the display device DD may correspond to a plane defined by a first direction DR1 and a second direction DR2 crossing the first direction DR1. The display surface IS may display the image IM in an upward direction, i.e., a direction opposite to a third direction DR3.

Meanwhile, FIG. 1 and the following drawings show first, second, and third directions DR1, DR2, and DR3, and the first, second, and third directions DR1, DR2, and DR3 may be relative to each other and may be changed in other directions. In each drawing, the directions indicated by the first, second, and third directions DR1, DR2, and DR3 may be assigned with the same reference numerals.

In the present disclosure, front (or upper) and rear (or lower) surfaces of each member of the display device DD may be defined with respect to a direction in which the image IM is displayed. The upper and lower surfaces may be opposite to each other in the third direction DR3, and a normal line direction of each of the upper and lower surfaces may be substantially parallel to the third direction DR3. A separation distance in the third direction DR3 between the upper and lower surfaces of each member may correspond to a thickness in the third direction DR3 of each member. In the following descriptions, the expression "when viewed in a plane" may mean a state of being viewed from the above of each member in the third direction DR3.

The display surface IS of the display device DD may include a display area DA and a non-display area NDA. The display area DA may be an area in which the image IM is displayed, and the non-display area NDA may be an area in which the image IM is not displayed. A user may view the image IM displayed through the display area DA. The image IM may be a video or a still image. FIG. 1 shows a clock widget and application icons as representative examples of the image IM.

The display area DA may have a quadrangular shape, however, this is merely one example. The shape of the display area DA may be designed in various ways. The non-display area NDA may surround the display area DA, however, it should not be limited thereto or thereby. The non-display area NDA may be defined adjacent to only one side of the display area DA or may be omitted.

As shown in FIG. 1, the display device DD may have a rectangular shape with long sides extending in the first direction DR1, short sides extending in the second direction DR2, and rounded corners. However, the shape of the display device DD should not be limited to the rectangular shape, and the display device DD may have a variety of shapes.

Meanwhile, the display device DD including a single-sided display surface IS where the display surface IS is defined on one surface of the display device DD is shown as a representative example, however, the display device DD may include a double-sided display surface where the display surface IS is defined on both the front and rear surfaces of the display device DD. The display surface IS of the display device DD should not be particularly limited.

The display device DD may be a foldable display device. The display device DD may be folded about an imaginary folding axis extending in a predetermined direction. FIG. 1 shows a first folding axis FX1 extending in the second direction DR2 and a second folding axis FX2 extending in the first direction DR1. The first folding axis FX1 may be substantially parallel to a short-side direction of the display device DD. The second folding axis FX2 may be substantially parallel to a long-side direction of the display device DD. According to an embodiment, the display device DD may be folded about at least one folding axis of the first folding axis FX1 and the second folding axis FX2.

Figure 2A:
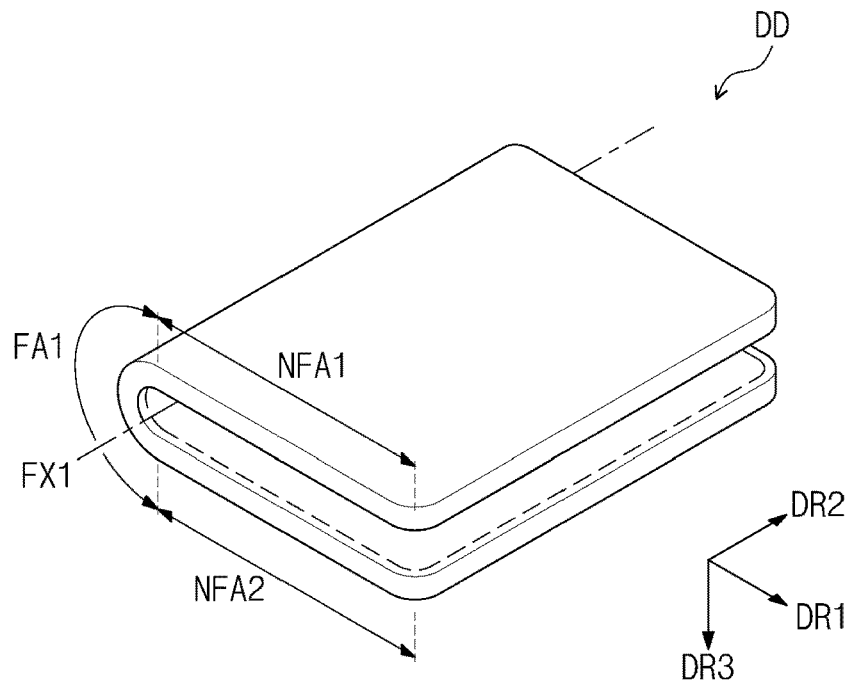
FIGS. 2A to 2D are perspective views showing a folded state of a display device according to an embodiment of the present disclosure.
Figure 2B:
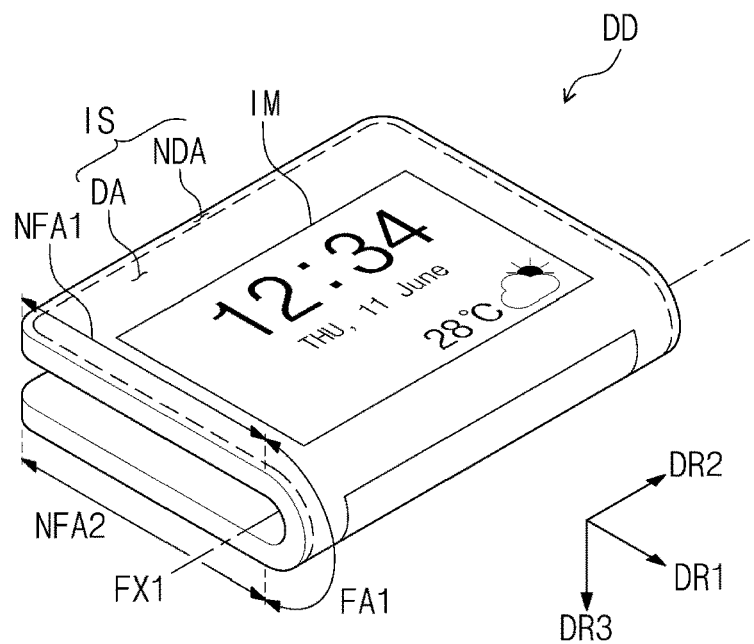
Figure 2C:
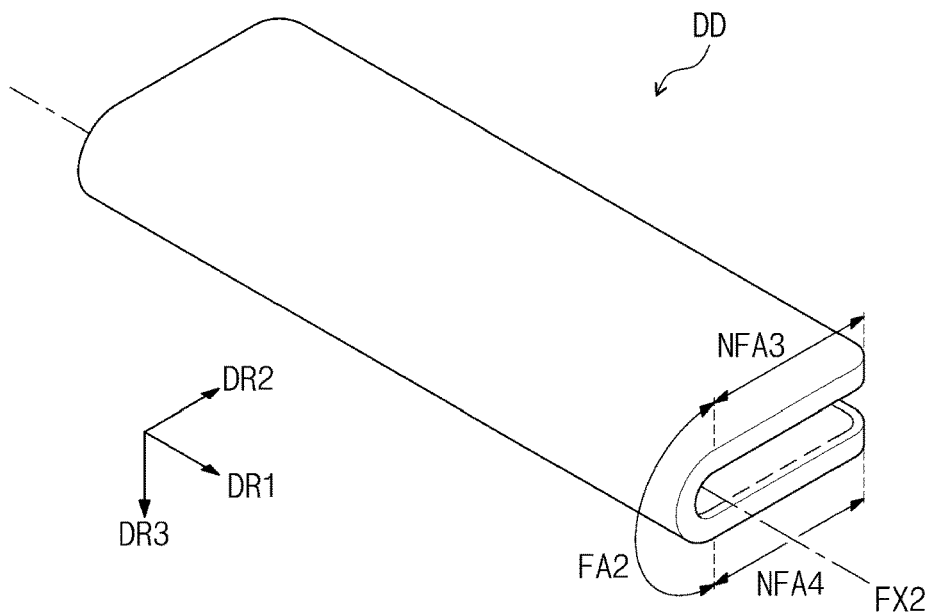
Figure 2D:
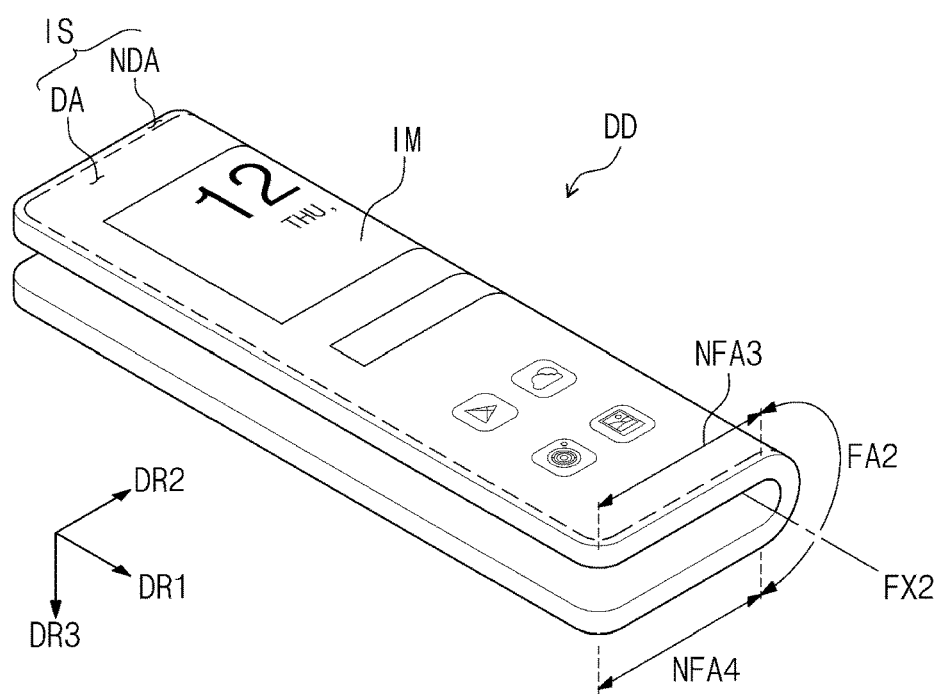

FIGS. 2A and 2B are perspective views showing the display device DD folded about the first folding axis FX1, and FIGS. 2C and 2D are perspective views showing the display device DD folded about the second folding axis FX2.

The display device DD may include a folding area and a non-folding area, which are distinguished from each other according to its operation mode. The folding area may be bent to have a predetermined curvature when the display device DD is folded about the folding axis. The non-folding area may be in a flat state when the display device DD is folded about the folding axis.

The display device DD may include at least one folding area and the non-folding area. FIGS. 2A to 2D show the display device DD including one folding area and two non-folding areas adjacent to the folding area with respect to one folding axis, however, it should not be limited thereto or thereby. According to an embodiment, the display device DD may include a plurality of folding areas folded respectively about a plurality of folding axes. The number of the folding areas and the number of the non-folding areas included in the display device DD should not be limited thereto or thereby.

Referring to FIGS. 2A and 2B, the display device DD folded about the first folding axis FX1 may include a first folding area FA1, a first non-folding area NFA1, and a second non-folding area NFA2. The first folding area FA1 may be folded at a predetermined curvature to surround the first folding axis FX1. The first non-folding area NFA1 may be defined adjacent to one side of the first folding area FA1 in the first direction DR1, and the second non-folding area NFA2 may be defined adjacent to the other side of the first folding area FA1 in the first direction DR1.

Referring to FIGS. 2C and 2D, the display device DD folded about the second folding axis FX2 may include a second folding area FA2, a third non-folding area NFA3, and a fourth non-folding area NFA4. The second folding area FA2 may be folded at a predetermined curvature to surround the second folding axis FX2. The third non-folding area NFA3 may be defined adjacent to one side of the second folding area FA2 in the second direction DR2, and the fourth non-folding area NFA4 may be defined adjacent to the other side of the second folding area FA2 in the second direction DR2.

The display device DD may be inwardly folded (in-folding) or outwardly folded (out-folding). In the present embodiment, a folding state in which the display device DD is folded to allow the display surface IS overlapping the folding area to face the folding axis is defined as the in-folding, and a folding state in which the display device DD is folded to allow a rear surface thereof overlapping the folding area to face the folding axis is defined as the out-folding. The display device DD may be manufactured to enable both in-folding and out-folding operations, or may be manufactured to enable any one of in-folding and out-folding operations.

FIG. 2A shows the display device DD inwardly folded about the first folding axis FX1, and FIG. 2C shows the display device DD inwardly folded about the second folding axis FX2. FIG. 2B shows the display device DD outwardly folded about the first folding axis FX1, and FIG. 2D shows the display device DD outwardly folded about the second folding axis FX2.

Referring to FIG. 2A, portions of the display surface IS, which respectively overlap the first non-folding area NFA1 and the second non-folding area NFA2 of the inwardly-folded display device DD, may face each other. Referring to FIG. 2C, portions of the display surface IS, which respectively overlap the third non-folding area NFA3 and the fourth non-folding area NFA4 of the inwardly-folded display device DD, may face each other. The rear surface of the inwardly-folded display device DD may be exposed to the outside.

Referring to FIG. 2B, portions of the display surface IS, which respectively overlap the first non-folding area NFA1 and the second non-folding area NFA2 of the outwardly-folded display device DD, may be exposed to the outside in directions opposite to each other. Referring to FIG. 2D, portions of the display surface IS, which respectively overlap the third non-folding area NFA3 and the fourth non-folding area NFA4 of the outwardly-folded display device DD, may be exposed to the outside in directions opposite to each other. Accordingly, the user may recognize the image IM provided by the display device DD in the out-folding state.

Figure 3:
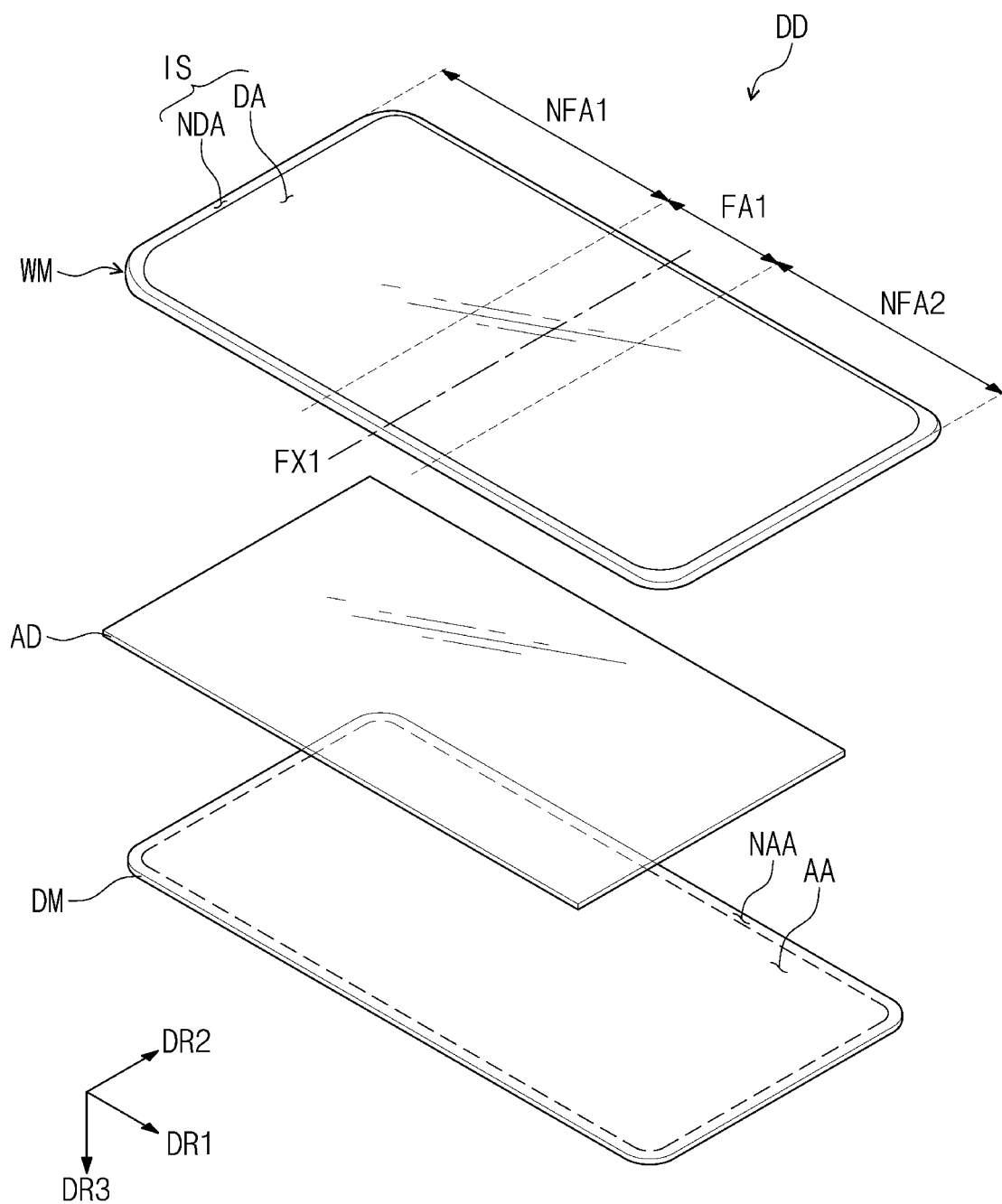
FIG. 3 is an exploded perspective view showing a display device according to an embodiment of the present disclosure.

FIG. 3 is an exploded perspective view showing the display device DD according to an embodiment of the present disclosure. FIG. 3 is an exploded perspective view showing the display device DD that is foldable about the first folding axis FX1 as a representative example. The display device DD may include a display module DM, a window WM, and an adhesive layer AD.

The display module DM may display an image in response to electrical signals and may transmit and receive information about an external input. The display module DM may include an active area AA and a peripheral area NAA.

The active area AA may be activated in response to electrical signals. As an example, the display module DM may output images or may sense a variety of external inputs through the active area AA. The active area AA may correspond to at least a portion of the display area DA.

The peripheral area NAA may be defined adjacent to the active area AA. As an example, the peripheral area NAA may surround the active area AA, however, this is merely one example. According to an embodiment, the peripheral area NAA may be defined in various ways, for example, the peripheral area NAA may be disposed adjacent to one side of the active area AA, however, it should not be particularly limited. The peripheral area NAA may correspond to at least a portion of the non-display area NDA.

Although not shown in figures, the display module DM may include a display panel. The display panel may generate images emitted from the display module DM. The display panel may be a light emitting type display panel, however, it should not be particularly limited. For instance, the display panel may be an organic light emitting display panel or a quantum dot light emitting display panel. Meanwhile, the display module DM may further include an input sensor disposed on the display panel to sense the external input.

The display module DM may include a plurality of pixels arranged in the active area AA and a circuit unit disposed in the peripheral area NAA. The circuit unit may apply electrical signals to the pixels to drive the pixels. The pixels may be arranged in the active area AA to form light emitting patterns. The light emitting patterns of the pixels to which the electrical signals from the circuit unit are applied may emit lights in response to the electrical signals and thus may display the images through the active area AA.

The window WM may be disposed on the display module DM. The window WM may cover an entire upper surface of the display module DM. The window WM may have a shape corresponding to a shape of the display module DM. The window WM may alleviate external impacts to prevent the display module DM from being damaged or malfunctioning due to the external impacts.

The window WM may include an optically transparent material. The window WM may include an optically transparent substrate described later. As an example, the window WM may include a glass substrate, and the glass substrate may be a tempered glass substrate.

The window WM may have a single-layer structure or a multi-layer structure. As an example, the window WM may have the single-layer structure of the glass substrate or may have the multi-layer structure of the glass substrate, a coating layer coated on the glass substrate, and a filling member, or the multi-layer structure of a polymer film disposed on the glass substrate.

A front surface of the window WM may correspond to the front surface of the display device DD. The front surface of the window WM may correspond to the display surface IS of the display device DD. The window WM may include the display area DA and the non-display area NDA.

The display area DA of the window WM may transmit the images emitted from the display module DM. The user may view the images through the display area DA of the window WM. The window WM may have a predetermined color in an area overlapping the non-display area NDA. As an example, the window WM may further include a printed layer formed on the glass substrate to overlap the non-display area NDA.

The window WM may be flexible. The window WM may be folded with the display module DM about the first folding axis FX1. The window WM may include a first folding area FA1 curved to have a predetermined curvature when folded about the first folding axis FX1 and a plurality of non-folding areas NFA1 and NFA2 defined adjacent to the first folding area FA1.

As shown in FIG. 3, the window WM may have the quadrangular shape with rounded corners, however, this is merely one example. The window WM may have a variety of shapes corresponding to that of the display module DM. The shape of the window WM may vary depending on the design of the substrate manufactured through a manufacturing process of the window WM.

The adhesive layer AD may be disposed between the window WM and the display module DM. The adhesive layer AD may attach the window WM to the display module DM. The adhesive layer AD may be an optically clear adhesive (OCA) film or an optically clear adhesive resin (OCR) layer. The adhesive layer AD may be integrally formed with the filling member of the window WM described later, however, it should not be limited thereto or thereby. According to an embodiment, the adhesive layer AD may be omitted.

Meanwhile, although not shown in figures, the display device DD may further include at least one functional layer disposed between the display module DM and the window WM. As an example, the display device DD may further include an anti-reflective layer to reduce a reflectance of an external light incident to the window WM from the above of the window WM.

Figure 4A:
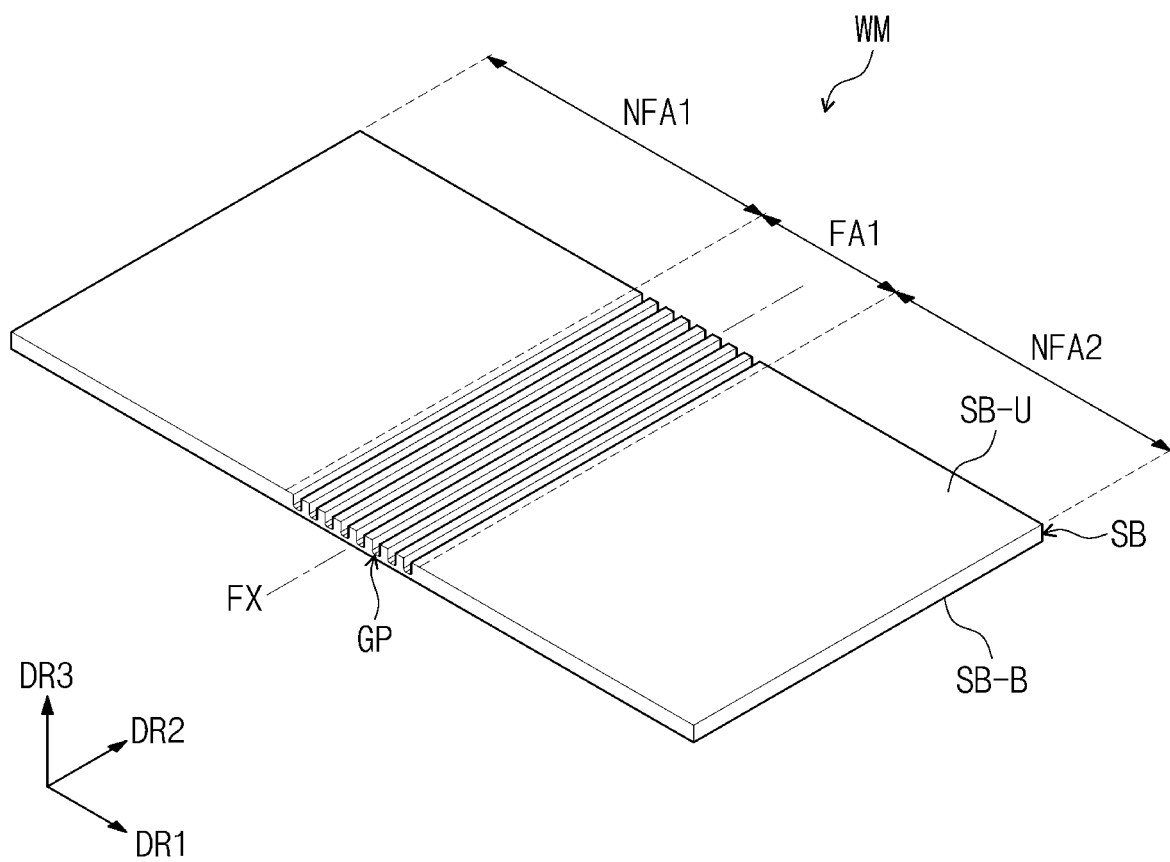
FIGS. 4A and 4B are perspective views showing windows according to embodiments of the present disclosure.
Figure 4B:
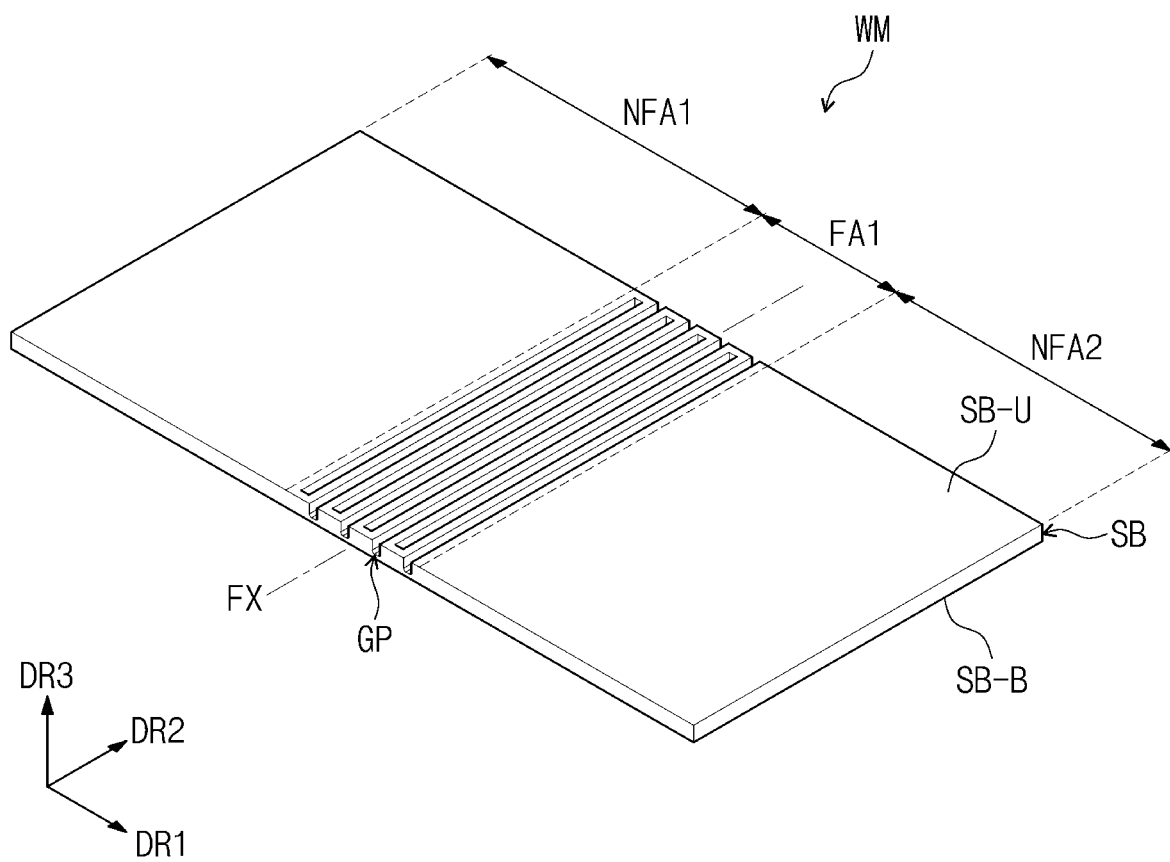

FIGS. 4A and 4B are perspective views showing windows WM according to embodiments of the present disclosure. The windows WM shown in FIGS. 4A and 4B may be disposed on the display module DM and may be applied to the display device DD as shown in FIG. 3, and details on the window WM described above may be applied to the windows WM in FIGS. 4A and 4B.

Referring to FIGS. 4A and 4B, the windows WM may be folded about an imaginary folding axis FX. The folding axis FX may extend in the second direction DR2 substantially parallel to short sides of the windows WM. The folding axis FX shown in FIGS. 4A and 4B may correspond to the first folding axis FX1 of FIG. 3, however, it should not be limited thereto or thereby. According to an embodiment, the windows WM may be folded about a folding axis extending in a direction substantially parallel to long sides of the windows WM, for example, the second folding axis FX2 of FIG. 1. That is, the shape of the windows WM that is foldable should not be particularly limited.

Each window WM may include a substrate SB and a plurality of groove patterns GP.

The substrate SB may include a folding area FA1 folded about the folding axis FX at a predetermined curvature and a plurality of non-folding areas NFA1 and NFA2 adjacent to the folding area FA1. The non-folding areas NFA1 and NFA2 may include a first non-folding area NFA1 and a second non-folding area NFA2. The first non-folding area NFA1 may be defined adjacent to one side of the folding area FA1 in the first direction DR1, and the second non-folding area NFA2 may be defined adjacent to the other side of the folding area FA1 in the first direction DR1. Meanwhile, the number of the folding areas and the number of the non-folding areas included in the substrate SB should not be limited to the embodiments shown in FIGS. 4A and 4B.

The substrate SB may include an upper surface SB-U and a lower surface SB-B. Each of the upper surface SB-U and the lower surface SB-B of the substrate SB may be substantially parallel to a plane defined by the first direction DR1 and the second direction DR2. The upper surface SB-U and the lower surface SB-B of the substrate SB may be opposite to each other in the third direction DR3.

As shown in FIGS. 4A and 4B, the lower surface SB-B of the substrate SB may face the folding axis FX. The lower surface SB-B of the substrate SB may be disposed more adjacent to the folding axis FX in the third direction DR3 than the upper surface SB-U is. When the substrate SB is folded, the lower surface SB-B may be folded to surround the folding axis FX, however, it should not be limited thereto or thereby. According to an embodiment, the upper surface SB-U of the substrate SB may face the folding axis FX.

The substrate SB may have a cuboid shape in which the upper surface SB_U and the lower surface SB_B are substantially parallel to each of the first direction DR1 and the second direction DR2, and a height, i.e., a thickness, is defined along the third direction DR3. FIGS. 4A and 4B show the substrate SB having right-angled corners, however, the substrate SB should not be limited thereto or thereby. According to an embodiment, the substrate SB may have a cuboid shape with rounded corners to correspond to the shape of the window WM shown in FIG. 3.

The substrate SB may include an optically transparent material. As an example, the substrate SB may include a glass substrate and in detail may include a tempered glass substrate. As the substrate SB includes the glass substrate, the display device DD may have excellent aesthetic and may be prevented from being dented or scratched by sharp objects.

The substrate SB may have a predetermined thickness in the third direction DR3. The thickness of the substrate SB may exert influences on an impact resistance of the window WM. In a case where the thickness of the substrate SB is thin, the substrate SB may be broken or damaged by external impacts concentrated at a localized area, for example, by external impacts caused by a pen drop. In a case where the thickness of the substrate SB is thick, a flexibility of the substrate SB may decrease or the substrate SB may be broken when the substrate SB is folded. As an example, the thickness of the substrate SB may be equal to or greater than about 30 μm, and in detail, the thickness of the substrate SB may be equal to or greater than about 50 μm and equal to or smaller than about 300 μm. However, the thickness of the substrate SB should not be limited to the above numerical example. The substrate SB may improve the impact resistance of the window WM and thus may protect the display module DM disposed under the window WM.

The groove patterns GP may be defined in the folding area FA1 of the substrate SB. The groove patterns GP may be defined to overlap the folding area FA1 of the substrate SB. FIGS. 4A and 4B show eight groove patterns GP defined in the folding area FA1. However, the number of the groove patterns GP should not be limited thereto or thereby and may be greater or smaller than eight.

Each of the groove patterns GP may extend in one direction. For example, each of the groove patterns GP may extend in a direction substantially parallel to a direction in which the folding axis FX extends. FIGS. 4A and 4B show the groove patterns GP each extending in the second direction DR2 substantially parallel to the folding axis FX, however, the groove patterns GP should not be limited thereto or thereby. According to an embodiment, the groove patterns GP may extend obliquely with respect to the folding axis FX to cross the direction in which the folding axis FX extends.

The groove patterns GP may be arranged in one direction crossing the folding axis FX. The groove patterns GP may be arranged to be spaced apart from each other with portions of the upper surface SB-U of the substrate SB. FIGS. 4A and 4B show the groove patterns GP arranged in the first direction DR1 to be spaced apart from each other, however, the groove patterns GP should not be limited thereto or thereby. According to an embodiment, at least some patterns among the groove patterns GP may be connected to cross each other and thus may be integrally formed with each other.

Based on one groove pattern GP among the groove patterns GP, the groove pattern GP may extend from one end of the substrate SB to the other end of the substrate SB, however, it should not be limited thereto or thereby. According to an embodiment, the groove pattern GP may be surrounded by the upper surface SB-U of the substrate SB when viewed in a plane. Referring to FIG. 4A, each of the groove patterns GP may extend from one side surface of the substrate SB, which extends in the first direction DR1, to the other side surface of the substrate SB, which extends in the first direction DR1. Referring to FIG. 4B, some groove patterns among the groove patterns GP may extend in the first direction DR1 and may be surrounded by the upper surface SB-U of the substrate SB when viewed in a plane. Although not shown in figures, all the groove patterns GP may be surrounded by the upper surface SB-U of the substrate SB.

The groove patterns GP may be formed by recessing portions of the substrate SB from the upper surface SB-U of the substrate SB toward the lower surface SB-B. Each of the groove patterns GP may be recessed from the upper surface SB-U of the substrate SB and may be defined by a side surface, which is connected to the upper surface SB-U of the substrate SB, and a bottom surface. Each of the groove patterns GP may include the bottom surface substantially parallel to the upper surface SB-U and the side surface connecting the bottom surface to the upper surface SB-U of the substrate SB. Each of the side surfaces of the groove patterns GP may include at least one curved surface. The shape and arrangement of the groove patterns GP will be described in detail below with reference to drawings.

As the groove patterns GP are arranged in the folding area FA1, the window WM may have improved folding property. A thickness of portions of the substrate SB, which overlap the groove patterns OP in the folding area FA1, may relatively decrease, and the flexibility of the substrate SB may be improved by the groove patterns GP. When the substrate SB is folded, the folding area FA1 of the substrate SB may be bent at a predetermined curvature and a compressive or tensile stress may be applied to the substrate SB in an area overlapping the folding area FA1. The groove patterns GP may reduce the compressive or tensile stress in the substrate SB and thus may prevent the substrate SB from being damaged due to the folding operation.

Figure 5A:
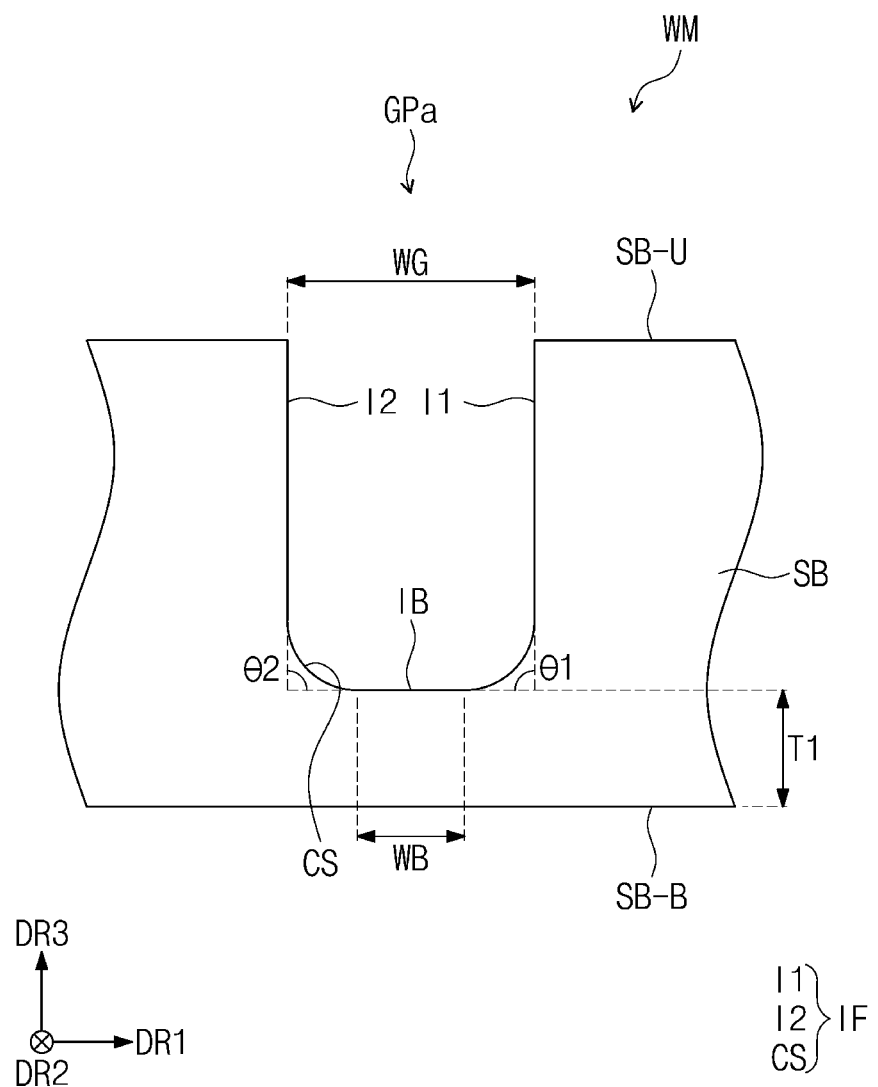
FIGS. 5A to 5C are cross-sectional views showing groove patterns according to embodiments of the present disclosure.
Figure 5B:
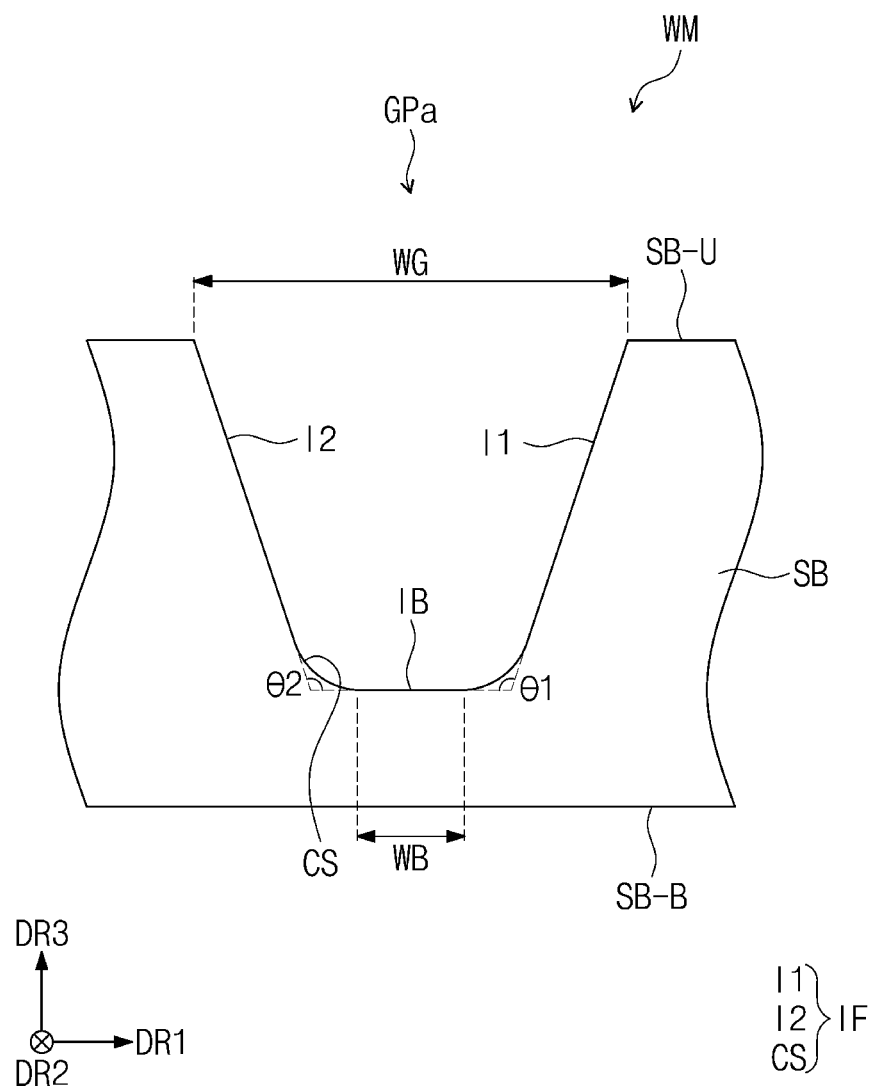
Figure 5C:
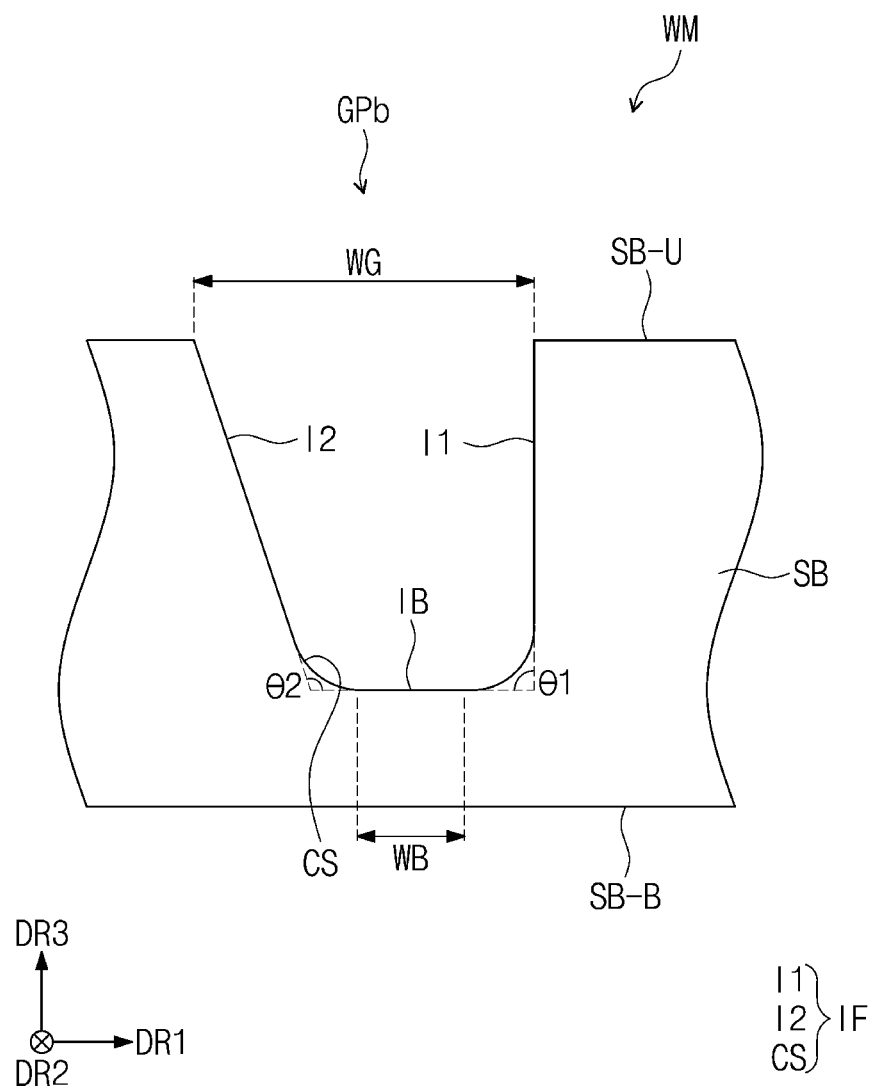

FIGS. 5A to 5C are cross-sectional views showing groove patterns according to embodiments of the present disclosure. FIGS. 5A to 5C show various cross-sections of the groove patterns as a representative example.

Referring to FIG. 5A, a groove pattern GPa may be formed by recessing a portion of a substrate SB from an upper surface SB-U of the substrate SB toward a lower surface SB-B of the substrate SB and may be defined by a side surface IF connected to the upper surface SB-U of the substrate SB and a bottom surface IB. Accordingly, the groove pattern GPa may include the bottom surface IB and the side surface IF connected to the bottom surface IB.

The bottom surface IB of the groove pattern GPa may be recessed from the upper surface SB-U of the substrate SB and may be substantially parallel to the upper surface SB-U. As an example, the bottom surface IB of the groove pattern GPa may be substantially parallel to each of the first direction DR1 and the second direction DR2. The bottom surface IB of the groove pattern GPa may include a flat surface substantially parallel to the upper surface SB-U.

When viewed in a cross-section, a thickness T1 (hereinafter, referred to as a first thickness T1) from the lower surface SB-B of the substrate SB to the bottom surface IB of the groove pattern GPa may be smaller than a thickness from the lower surface SB-B of the substrate SB to the upper surface SB-U of the substrate SB. As an example, the first thickness T1 may be equal to or greater than about 1 μm and equal to or smaller than about 30 μm. A portion of the substrate SB overlapping the groove pattern GPa may have a relatively thin thickness compared with the other portion of the substrate SB, which does not overlap the groove pattern GPa, and thus, the folding property of the window WM may be improved. The other portion of the substrate SB, which does not overlap the groove pattern GPa, may have a relatively thick thickness compared with the portion of the substrate SB, which overlaps the groove pattern GPa, and thus, the window WM may have the impact resistance against the external impacts.

The side surface IF of the groove pattern GPa may be bent from the bottom surface IB and may be connected to the upper surface SB-U of the substrate SB. The side surface IF of the groove pattern GPa may be connected to the upper surface SB-U in a bent form from the upper surface SB-U of the substrate SB. The side surface IF and the bottom surface IB of the groove pattern GPa may be connected to each other and may be integrally formed with each other.

The side surface IF of the groove pattern GPa may include a first surface I1, a second surface I2, and at least one curved surface CS. The curved surface CS may be bent from the bottom surface IB and may have a predetermined curvature. The curved surface CS may connect the first surface I1 and the bottom surface IB. Although not shown in figures, the curved surface CS may connect the second surface I2 and the bottom surface IB. Accordingly, when the window WM is folded, the stress may be prevented from being concentrated at a lower portion of the substrate SB overlapping the curved surface CS, and the window WM may be prevented from being damaged in spite of the repeated folding operation.

Each of the first surface I1 and the second surface I2 may be connected to the upper surface SB-U of the substrate SB. The first surface I1 and the second surface I2 may correspond to some portions of the side surface IF of the groove pattern GPa, which are substantially flat. The first surface I1 and the second surface I2 may face each other. The first surface (1 may face the second surface I2 in the first direction DR1 crossing a direction in which the groove pattern GPa extends.

The side surface IF of the groove pattern GPa may be inclined at a predetermined angle with respect to the bottom surface IB. A slope of the side surface IF of the groove pattern GPa may correspond to an included angle between the side surface IF and the bottom surface IB. In detail, each of the first surface I1 and the second surface I2 of the side surface IF may be inclined at a predetermined angle with respect to the bottom surface IB. Included angles associated with the first surface I1 and the second surface I2 may be respectively defined as an angle between the first surface I1 and the bottom surface IB and an angle between the second surface I2 and the bottom surface IB. The included angle between the first surface I1 and the bottom surface IB may have a first angle $\Theta 1$, and the included angle between the second surface I2 and the bottom surface IB may have a second angle $\Theta 2$. Each of the first angle $\Theta 1$ and the second angle $\Theta 2$ may be equal to or greater than about 90 degrees and equal to or smaller than about 140 degrees.

The groove pattern GPa may have a lower width and an upper width. The lower width of the groove pattern GPa may be defined as a width WB of the bottom surface IB of the groove pattern GPa. The width WB of the bottom surface IB may be defined in the first direction DR1 crossing the direction in which the groove pattern GPa extends. As an example, the width WB of the bottom surface IB may be equal to or greater than about 40 μm. In a case where the width WB of the bottom surface IB is smaller than about 40 μm, when the window WM is folded, the stress may be concentrated at the lower portion of the substrate SB, which overlaps the bottom surface IB. As the bottom surface IB of the groove pattern GPa includes the flat surface with a predetermined width, the stress may be prevented from being locally concentrated at the lower portion of the substrate SB overlapping the groove pattern GPa. In addition, the groove pattern GPa may reduce the stress acting on the substrate SB when the window WM is folded, and thus, the folding property of the window WM may be improved.

The upper width of the groove pattern GPa may be defined as a distance from a boundary between the upper surface SB-U of the substrate SB and the first surface I1 to a boundary between the upper surface SB-U of the substrate SB and the second surface I2. Hereinafter, the upper width of the groove pattern GPa may be defined as a width WG of the groove pattern GPa. The width WO of the groove pattern GPa may be defined along the first direction DR1 crossing the direction in which the groove pattern GPa extends.

The first angle Θ1 and the second angle Θ2 of the groove pattern may be changed in various ways depending on a method of forming the groove pattern. In addition, the width WG of the groove pattern may be substantially the same as or greater than the width WB of the bottom surface IB depending on a curvature of the curved surface CS, an area of the curved surface CS, or the slope of the side surface IF.

As an example, referring to FIGS. 5A and 5B, the first angle Θ1 and the second angle 92, which face each other, of the groove pattern GPa may be substantially the same as each other. As shown in FIG. 5A, each of the first angle Θ1 and the second angle Θ2 may have a value close to about 90 degrees. Accordingly, the first surface I1 and the second surface I2 may be substantially perpendicular to the bottom surface IB, however, they should not be limited thereto or thereby. As shown in FIG. 5B, each of the first angle Θ1 and the second angle Θ2 may be greater than about 90 degrees. The side surface IF of the groove patter GPa of FIG. 5B may be more inclined to the lower surface SB-B of the substrate SB than the side surface IF of the groove pattern GPa of FIG. 5A is. As the first angle Θ1 and the second angle Θ2 are greater than about 90 degrees, a difference between the width WG of the groove pattern GPa and the width WB of the bottom surface IB may increase.

Meanwhile, a first angle Θ1 and a second angle Θ2, which face each other, of a groove pattern GPb may be different from each other as shown in FIG. 5C. As an example, the second angle Θ2 may be greater than the first angle Θ1. Accordingly, a second surface I2 of the groove pattern GPb may be more inclined to the lower surface SB-B of the substrate SB than a first surface I1 is. As at least one of the first angle Θ1 and the second angle Θ2 is greater than about 90 degrees, a difference between a width WG of the groove pattern GPb and a width WB of a bottom surface IB may increase.

Accordingly, the groove patterns having different widths WG from each other may be formed by adjusting the first angle Θ1 and the second angle Θ2 of the groove patterns having the same width WB of the bottom surface IB. Meanwhile, the embodiments shown in FIGS. 5A to 5C are merely examples, and the groove pattern may have a variety of shapes depending on the slope of the side surface, the curvature of the curved surface, the area of the curved surface, and the width of the bottom surface, however, it should not be limited thereto or thereby.

The groove patterns GP included in one window WM may have substantially the same shape and size, however, they should not be limited thereto or thereby. The groove patterns GP included in one window WM may have different shapes or widths from each other. Hereinafter, various embodiments of the groove patterns will be described in detail with reference to accompanying drawings.

FIGS. 6A to 6E are cross-sectional views showing windows according to embodiments of the present disclosure. FIGS. 6A to 6E respectively show various embodiments according to a shape and an arrangement of a plurality of groove patterns GP. FIGS. 6A to 6E show eight groove patterns GP, e.g., GP1, GP2, GP3, GP4, . . . . GPn−1, and GPn, however, the number of the groove patterns GP should not be limited to eight. Details of the elements of the window described above may also be applied to elements of the windows, which are assigned with the same or similar reference numerals, in FIGS. 6A to 6E.

Referring to FIGS. GA to 6E, the groove patterns GP may include n groove patterns GP1 to GPn arranged in the first direction DR1. The n groove patterns GP1 to GPn may be arranged in the first direction DR1 between the first non-folding area NFA1 and the second non-folding area NFA2. For the convenience of explanation, a groove pattern nearest to the first non-folding area NFA1 among the groove patterns GP may be defined as a first groove pattern GP1, and the numbers in the reference numerals of the groove patterns may increase by one (1) as a distance from the first non-folding area NFA1 increases along the first direction DR1. Accordingly, a groove pattern farthest from the first non-folding area NFA1 among the groove patterns GP may be defined as an n-th groove pattern GPn. The n-th groove pattern GPn may be nearest to the second non-folding area NFA2.

The groove patterns GP may be spaced apart from each other with a portion of the upper surface SB-U of the substrate SB interposed therebetween in the first direction DR1. That is, side surfaces of the groove patterns GP adjacent to each other may be connected to the portion of the upper surface SB-U of the substrate SB.

Each of the groove patterns GP may include the side surface IF (refer to FIGS. 5A to 5C) including the first surface I1 and the second surface I2 facing the first surface I1 as described above. In the non-folded state, the first surface I1 of the groove patterns GP may be defined as a surface that is relatively closer to the folding axis FX in the first direction DR1 than the second surface I2 is. The second surface I2 of the groove patterns GP may be relatively farther from the folding axis FX in the first direction DR1 than the first surface I1 is.

The first surface I1 and the second surface I2 of the groove patterns GP may be inclined at the first angle Θ1 and the second angle Θ2, respectively, with respect to the bottom surface IB. Each of the first angle Θ1 and the second angle Θ2 may be equal to or greater than about 90 degrees and equal to or smaller than about 140 degrees. Details of the first angle Θ1 and the second angle Θ2 described above may be applied to the first angle Θ1 and the second angle Θ2 of FIGS. 6A to 6E. The first angle Θ1 and the second angle Θ2 are briefly shown in FIGS. 6A to 6E and subsequent drawings.

In addition, the first surface I1, the second surface I2, the first angle Θ1, and the second angle Θ2 are shown in some groove patterns among the groove patterns GP in FIGS. 6A to 6E, and details of the groove patterns described above may be equally applied to the groove patterns from which the reference numerals of the first surface I1, the second surface I2, the first angle Θ1, and the second angle Θ2 are omitted.

Each of the groove patterns GP may have a depth corresponding to a distance defined from the upper surface SB-U of the substrate SB to the bottom surface IB in the third direction DR3. The groove patterns GP may have substantially the same depth as each other. Accordingly, the thicknesses T1 (refer to FIG. 5A) from the lower surface SB-B of the substrate SB to the bottom surfaces IB of the groove patterns GP may be substantially the same as each other.

The groove patterns GP may be symmetrical to each other about the folding axis FX as shown in FIGS. 6A to 6E. Accordingly, the stress acting in the substrate SB overlapping the folding area FA1 may also act substantially symmetrically about the folding axis FX, however, it should not be limited thereto or thereby. According to an embodiment, the groove patterns GP may not be symmetrical with respect to the folding axis FX and should not be particularly limited.

In the present disclosure, a sum of a width of one groove pattern and a distance between the one groove pattern and another groove pattern adjacent to the one groove pattern in the first direction DR1 may be defined as a pitch. In detail, referring to FIGS. 6A to 6E, a sum of a width WG1 of the first groove pattern GP1 and a distance between the first groove pattern GP1 and a second groove pattern GP2 may be defined as a first pitch D1. That is, the first pitch D1 may correspond to a distance from a second surface I2 of the first groove pattern GP1 to a second surface I2 of the second groove pattern GP2 in the first direction DR1. Similarly, a second pitch D2 may correspond to a distance from the second surface I2 of the second groove pattern GP2 to a second surface I2 of a third groove pattern GP3. Although not shown in figures, an n-th pitch may correspond to a distance from a first surface I1 of an (n−1)th groove pattern GPn−1 to a first surface I1 of the n-th groove pattern GPn.

Figure 6A:
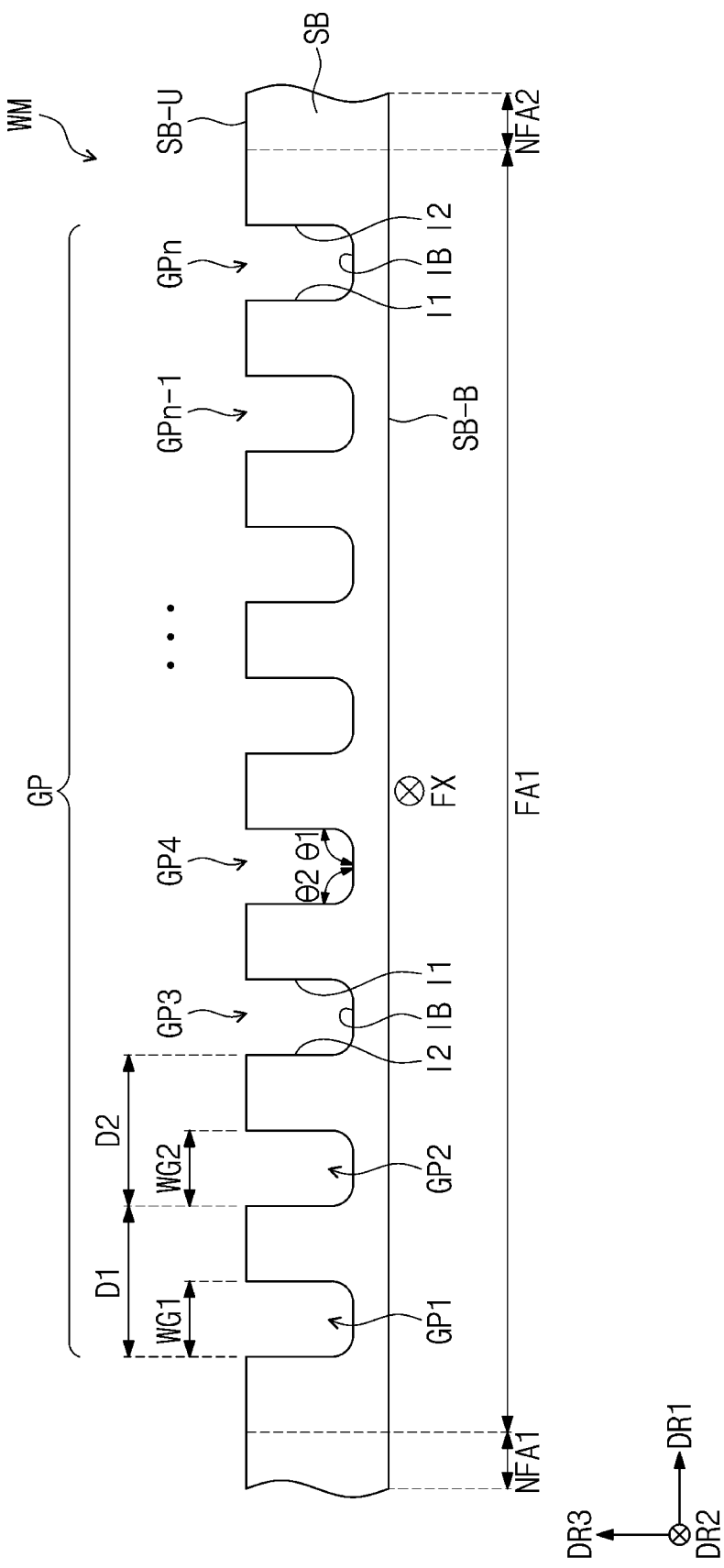
FIGS. 6A to 6E are cross-sectional views showing windows according to embodiments of the present disclosure.

As shown in FIG. 6A, the window WM may include the groove patterns GP formed to have pitches D1 and D2 that are same as each other, however, it should not be limited thereto or thereby. According to an embodiment, as shown in FIGS. 6B to 6E, the windows WMa, WMb, WMc, and WMd may include the groove patterns GP formed to have different pitches D1 and D2 from each other. Hereinafter, different features of the windows in the non-folded state will be mainly described with reference to accompanying drawings.

Figure 6B:
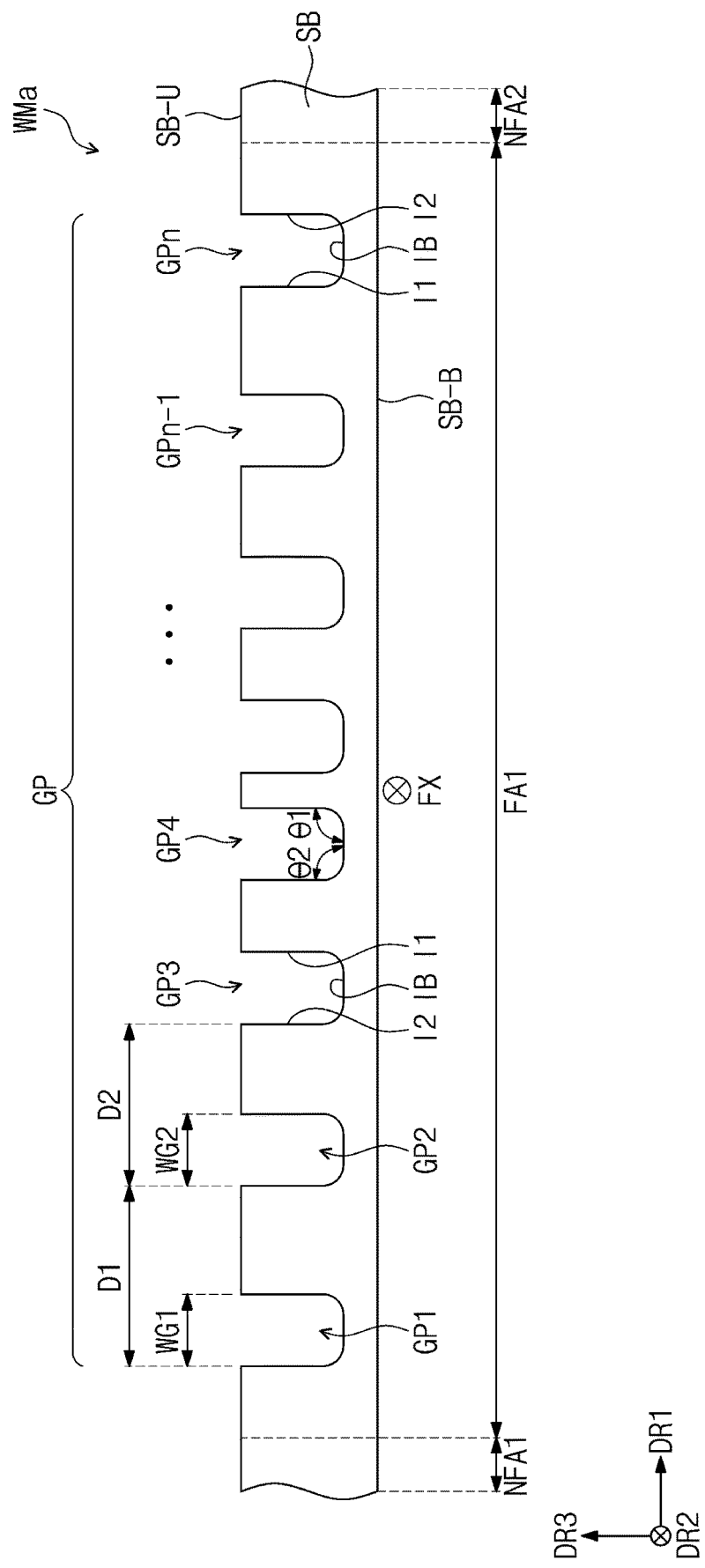
Figure 6C:
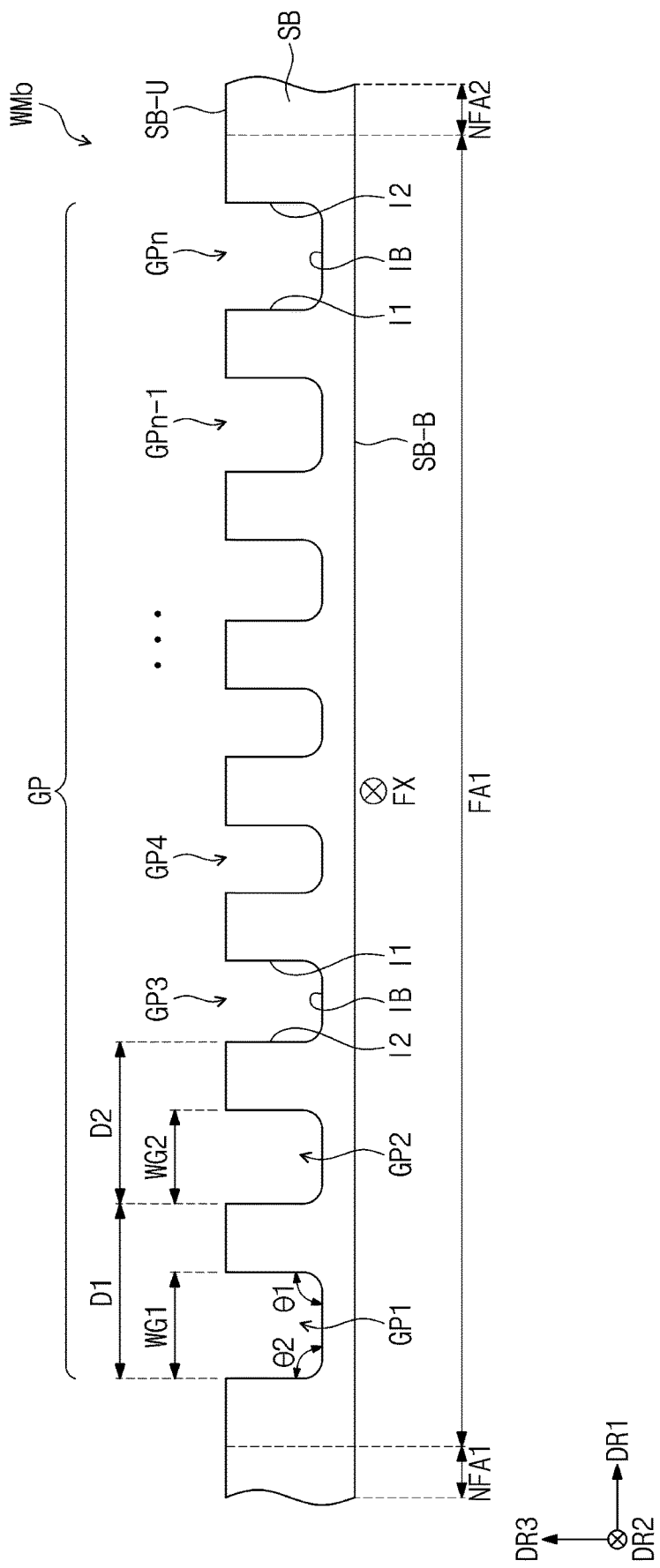

Referring to FIGS. 6A to 6C, the first angle Θ1 and the second angle Θ2, which face each other, of the groove patterns GP may be substantially the same as each other as in the groove pattern GPa shown in FIG. 5A. In addition, the first angles Θ1 of the groove patterns GP may be the same as each other, and the second angles Θ2 of the groove patterns OP may be the same as each other.

Referring to FIG. 6A, the groove patterns GP may be formed to have the same pitch. As an example, widths of the groove patterns GP may be the same as distances between the groove patterns GP. In detail, the width WG1 of the first groove pattern GP1 may be the same as a width WG2 of the second groove pattern GP2. In addition, the distance between the first groove pattern GP1 and the second groove pattern GP2 may be the same as the distance between the second groove pattern GP2 and the third groove pattern GP3. That is, the first pitch D1 and the second pitch D2 may be the same as each other. Similarly, the groove patterns GP having the same width as each other may be formed to have the same pitch as each other.

The folding property of the window WM may be improved by the groove patterns GP. In particular, when the groove patterns GP have the same width, distance, and shape as each other, processes of forming the groove patterns GP may be simplified.

Referring to FIGS. 6B and 6C, the windows WMa and WMb may include the groove patterns GP in which at least some groove patterns have different pitches D1 and D2 from each other. As shown in FIG. 6B, the widths of the groove patterns GP may be the same as each other, but the distances between the groove patterns GP may be different from each other. As shown in FIG. 6C, the distances between the groove patterns GP may be the same as each other, but the widths of the groove patterns OP may be different from each other. Meanwhile, although not shown in figures, the widths of the groove patterns GP and the distances between the groove patterns GP may be different from each other.

The distance between the groove patterns GP adjacent to each other may gradually decrease as a distance from the folding axis FX decreases. That is, the pitch of the groove patterns GP may decrease as the distance from the groove patterns GP to the folding axis FX is reduced, however, it should not be limited thereto or thereby. According to an embodiment, the distance between the groove patterns GP adjacent to each other may gradually increase as the distance from the folding axis FX decreases. As another way, the groove patterns OP may be formed so that the distance between groove patterns GP may be random. As an example, the distance between the first groove pattern GP1 and the second groove pattern GP2 may be substantially the same as the distance between the third groove pattern GP3 and a fourth groove pattern GP4 but may be different from the distance between the second groove pattern GP2 and the third groove pattern GP3.

Referring to FIG. 6C, the distance between the first groove pattern GP1 and the second groove pattern GP2 may be substantially the same as the distance between the second groove pattern GP2 and the third groove pattern GP3. However, the width WG1 of the first groove pattern GP1 may be different from the width WG2 of the second groove pattern GP2. As an example, the width WG1 of the first groove pattern GP1 may be greater than the width WG2 of the second groove pattern GP2. Accordingly, the first pitch D1 may be greater than the second pitch D2. As described above, the groove patterns GP may be formed to have different pitches by adjusting the widths of the groove patterns GP.

The groove patterns OP may include groove patterns in which the widths WB (refer to FIG. 5A) of the bottom surface IB are different from each other. As shown in FIG. 6C, the widths of the bottom surface IB of the groove patterns GP may decrease as the distance from the folding axis FX to the groove pattern decreases. As an example, the width of the bottom surface IB of the first groove pattern GP1 may be greater than the width of the bottom surface IB of the second groove pattern GP2, however, it should not be limited thereto or thereby. According to an embodiment, the widths of the bottom surface IB of the groove patterns GP may increase as a distance between the groove pattern and the folding axis FX decreases.

Figure 6D:
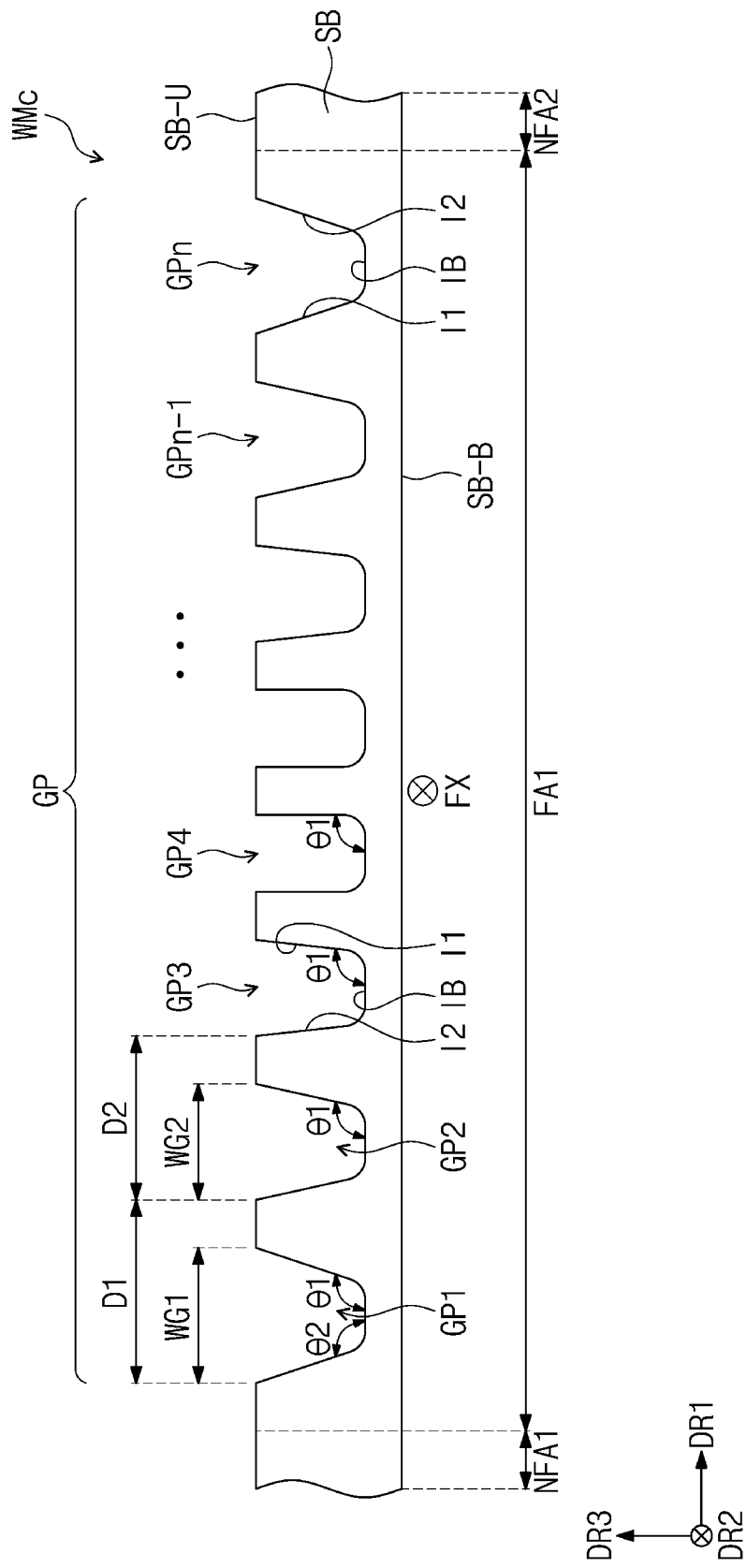

Referring to FIG. 6D, the first angle Θ1 and the second angle Θ2, which face each other, of the groove patterns GP may be the same as each other as in the groove pattern GPa shown in FIGS. 5A and 5B.

Different from the embodiments shown in FIGS. 6A to 6C, the first angles Θ1 of at least two groove patterns among the groove patterns GP may be different from each other. As an example, the first angle Θ1 of the groove patterns GP may decrease as a distance from the folding axis FX decreases. Each second angle Θ2 of the groove patterns GP may be substantially the same as the first angle Θ1 facing thereto. Accordingly, the second angles Θ2 of the groove patterns GP may decrease as the distance from the folding axis FX decreases.

In detail, the first angle Θ1 and the second angle Θ2 of the first groove pattern GP1 may be the same as each other, and the first angle Θ1 and the second angle Θ2 of the second groove pattern GP2 may be the same as each other. The first angle Θ1 of the first groove pattern GP1 may be greater than the first angle Θ1 of the second groove pattern GP2. Similarly, the second angle Θ2 of the first groove pattern GP1 may be greater than the second angle Θ2 of the second groove pattern GP2.

The side surfaces of the groove patterns GP may be more inclined toward the lower surface SB-B of the substrate SB as the distance from the groove pattern to the folding axis FX increases, however, they should not be limited thereto or thereby. According to an embodiment, the side surfaces of the groove patterns OP may be more inclined toward the lower surface SB-B of the substrate SB as the distance from the groove pattern to the folding axis FX decreases.

Figure 6E:
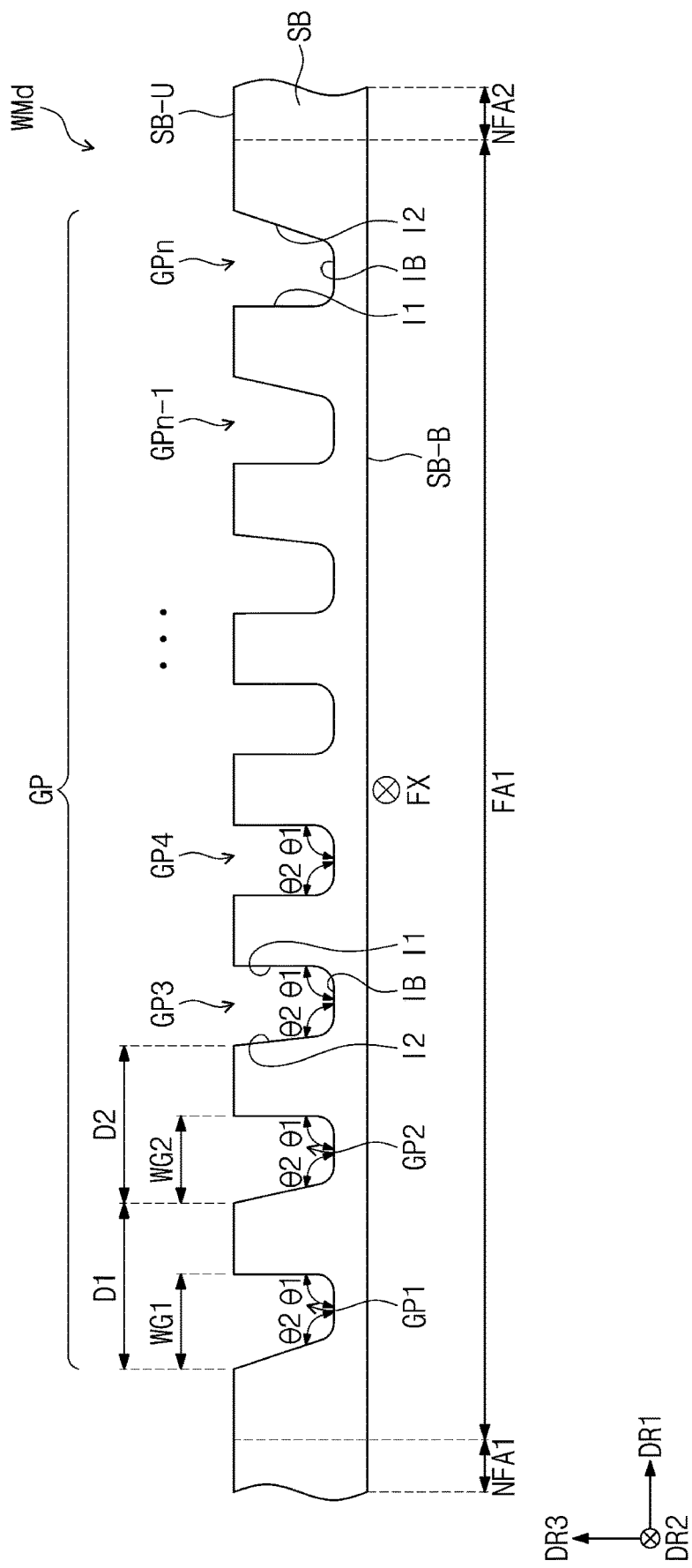

Referring to FIG. 6E, the first angle Θ1 and the second angle Θ2, which face each other, of at least some groove patterns among the groove patterns OP may be different from each other as in the groove pattern GPb shown in FIG. 5C.

The groove patterns GP may include the groove patterns in which the first angles Θ1 are the same as each other but the second angles Θ2 are different from each other. As an example, the first angles Θ1 of the groove patterns GP may be the same as each other. Slopes of the first surfaces I1 of the groove patterns GP may be the same as each other. Meanwhile, the second angles Θ2 of the groove patterns OP may decrease as a distance between the groove pattern and the folding axis FX decreases. Accordingly, the slope of the second surface I2 may be closer to the slope of the first surface I1 as the distance between the groove pattern and the folding axis FX decreases. That is, the second surfaces I2 of the groove patterns GP may be more inclined toward the lower surface SB-B of the substrate SB as the distance from the groove pattern to the folding axis FX in the first direction DR1 increases.

In detail, the first angle Θ1 and the second angle Θ2 of the first groove pattern GP1 may be different from each other, and the first angle Θ1 and the second angle Θ2 of the second groove pattern GP2 may be different from each other. The first angle Θ1 of the first groove pattern GP1 may be the same as the first angle Θ1 of the second groove pattern GP2. The second angle Θ2 of the first groove pattern GP1, which is more distant from the folding axis FX than the second groove pattern GP2 is, may be greater than the second angle Θ2 of the second groove pattern GP2. Similarly, the first angle Θ1 of each of the third groove pattern GP3 and the fourth groove pattern GP4 may be the same as the first angle Θ1 of the first groove pattern GP1. However, the second angle Θ2 of the third groove pattern GP3, which is closer to the folding axis FX than the second groove pattern GP2 is, may be smaller than the second angle Θ2 of the second groove pattern GP2.

Meanwhile, although not shown in figures, the present disclosure should not be limited thereto or thereby. According to an embodiment, the groove patterns GP may include groove patterns in which the second angles Θ2 are the same as each other but the first angles Θ1 are different from each other. As an example, the slopes of the second surfaces I2 of the groove patterns GP may be the same as each other, and the slope of the first surface I1 may be closer to the slope of the second surface I2 as the distance from the groove pattern to the folding axis FX increases.

Referring to FIGS. 6D and GE, the bottom surfaces IB of the groove patterns GP may have substantially the same width WB (refer to FIG. 5A). The groove patterns GP may have different widths depending on the size of the first angle Θ1 and the second angle Θ2. In detail, the bottom surfaces IB of the first groove pattern GP1 and the second groove pattern GP2 may have the same width as each other. The first angle Θ1 and/or the second angle Θ2 of the first groove pattern GP1 may be greater than the first angle Θ1 and/or the second angle Θ2 of the second groove pattern GP2, and thus, the width WG1 of the first groove pattern GP1 may be greater than the width WG2 of the second groove pattern GP2. That is, the groove patterns GP of the windows WMc and WMd may be formed to allow the groove patterns adjacent to each other to have different pitches.

Meanwhile, FIGS. 6D and 6E show embodiments in which the distances between the groove patterns GP are the same as each other, however, they should not be limited thereto or thereby. According to an embodiment, at least some distances among the distances between the groove patterns GP may have different values from each other.

When the window WM including the groove patterns OP with a uniform pitch is disposed on the display module DM, a moiré phenomenon may be caused by the pixels of the display module DM, which have a specific pattern. The moiré phenomenon is a phenomenon in which an interference pattern is seen by overlapping components each having a specific arrangement. However, the groove patterns GP may be formed such that the groove patterns adjacent to each other may have different pitches by adjusting the width and/or the distance of the groove patterns. Accordingly, the moiré phenomenon caused in the display device DD may be reduced, and a visibility of the display device DD may be improved. Particularly, in a case where the slope of the side surfaces of the groove pattern is equal to or greater than about 90 degrees, e.g., about 135 degrees, the visibility of the display device DD may be effectively improved.

Figure 7:
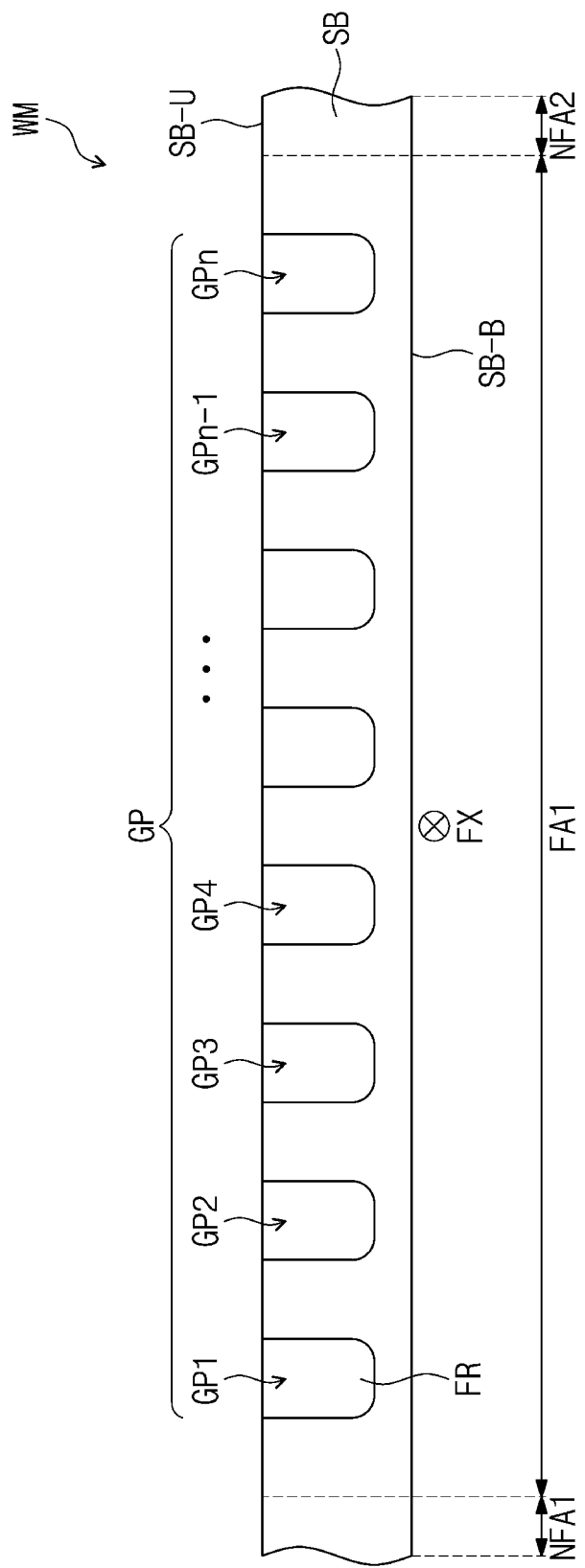
FIG. 7 is a cross-sectional view showing a window according to an embodiment of the present disclosure.

FIG. 7 is a cross-sectional view showing a window WM according to an embodiment of the present disclosure. The window WM shown in FIG. 7 includes substantially the same configurations as those of the window WM shown in FIG. 6A except some configurations. In FIG. 7, descriptions will be focused on the differences, and the following descriptions may be applied to the above-described embodiments.

Referring to FIG. 7, the window WM may further include a filling member FR. The filling member FR may be filled in groove patterns GP. The filling member FR may be in contact with a bottom surface and a side surface of the groove patterns GP. The filling member FR may have a shape corresponding to a shape of the groove patterns GP. As the filling member FR is filled in inner spaces defined by the groove patterns OP, the external impacts may be absorbed, and the impact resistance of a folding area FA1 of the window WM may be compensated for.

The filling member FR may include an organic material. As an example, the filling member FR may include a resin having elasticity. The filling member FR may maintain the improved folding property of the window WM and may prevent the window WM from being deformed due to the compressive or tensile stress applied thereto during the folding operation.

The filling member FR may include an optically transparent material. Accordingly, the user may view the images provided through the display surface IS (refer to FIG. 3) overlapping the folding area FA1 of the window WM.

The filling member FR may include the same material as that of the adhesive layer AD (refer to FIG. 3). The filling member FR may be integrally formed with adhesive layer AD (refer to FIG. 3), however, it should not be limited thereto or thereby. According to an embodiment, the filling member FR and the adhesive layer AD (refer to FIG. 3) may include different materials from each other.

Figure 8A:
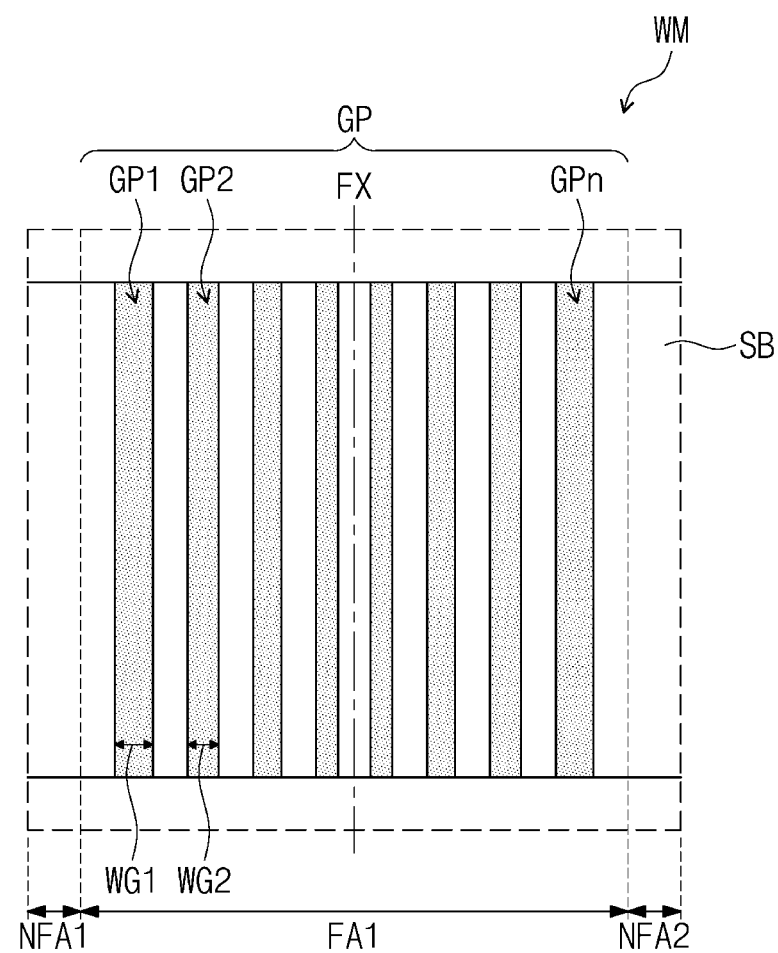
FIGS. 8A to 8C are plan views showing windows according to embodiments of the present disclosure.
Figure 8B:
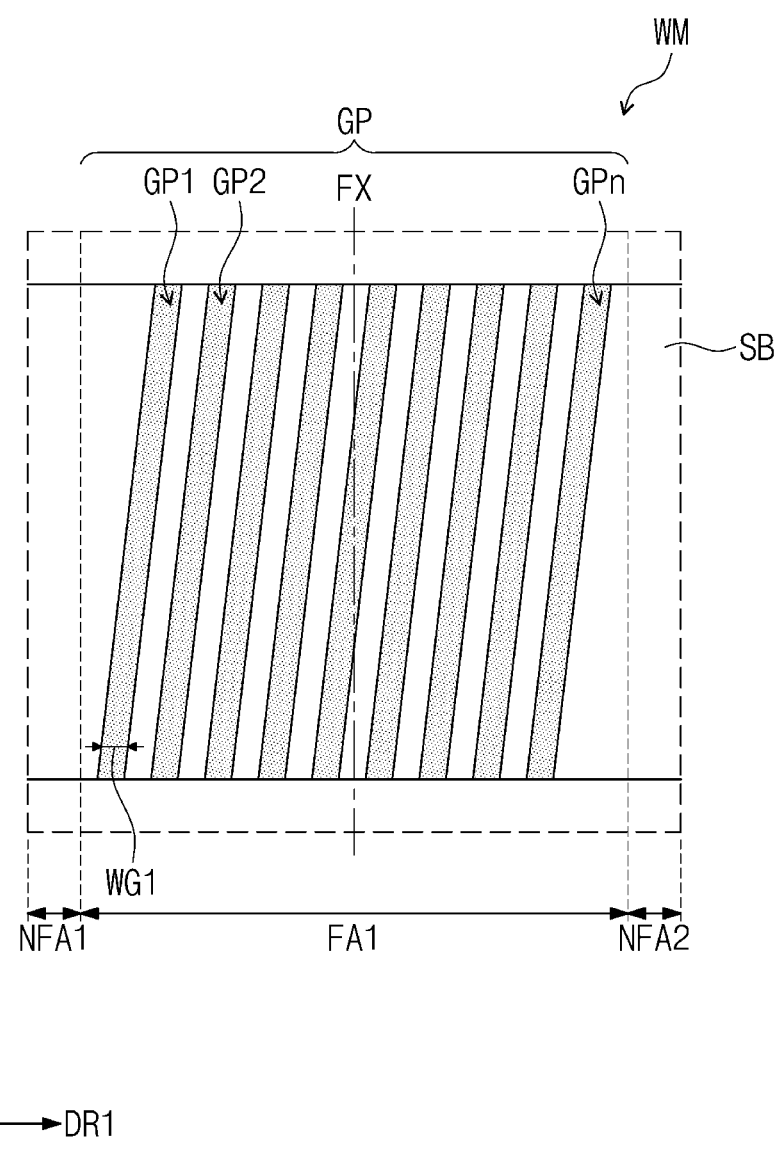
Figure 8C:
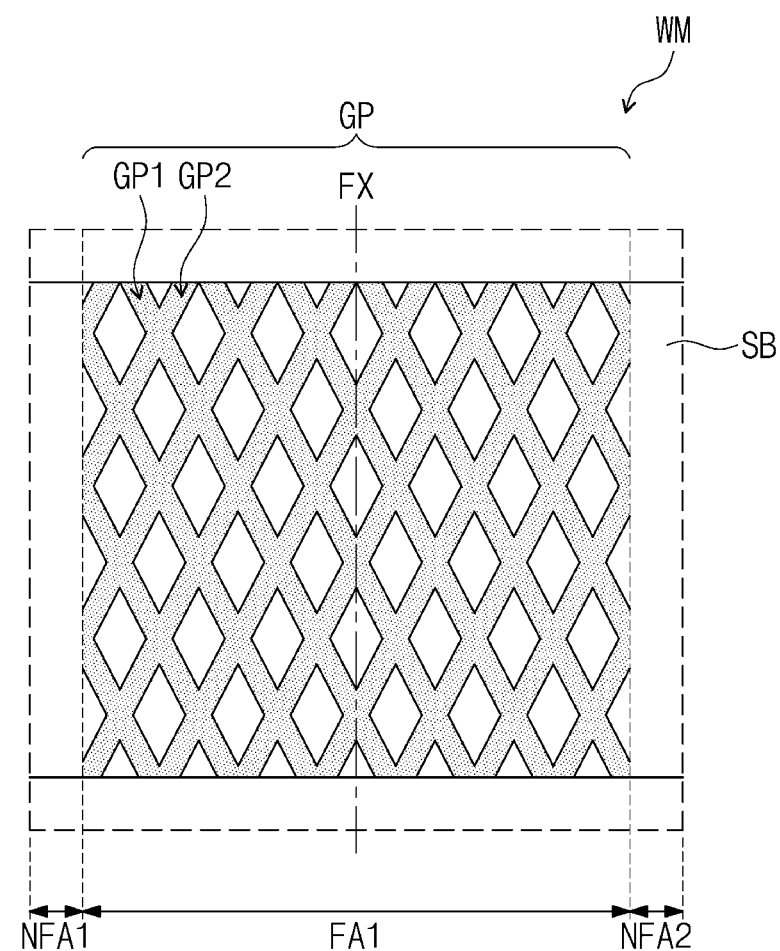

FIGS. 8A to 8C are plan views showing windows WM according to embodiments of the present disclosure. For the convenience of explanation, groove patterns GP recessed from an upper surface of a substrate SB are shown hatched in FIGS. 8A to 8C.

Referring to FIG. 8A, the groove patterns GP may be arranged in a folding area FA1 along the first direction DR1. The groove patterns OP may extend in the second direction DR2 crossing the direction in which the groove patterns GP are arranged. The direction in which the groove patterns GP extend may be substantially parallel to a direction in which a folding axis FX extends.

The groove patterns GP may be symmetrical with respect to the folding axis FX. The groove patterns GP may have a width decreasing as a distance between the groove pattern and the folding axis EX decreases. However, the width of the groove patterns GP may increase as the distance between the groove pattern and the folding axis FX decreases, or widths of the groove patterns GP may be the same as each other, and the widths of the groove patterns GP should not be particularly limited.

Referring to FIG. 8B, the groove patterns GP may be arranged in a folding area FA1 along the first direction DR1. The groove patterns GP may extend in a direction inclined with respect to a folding axis FX extending in the second direction DR2. The groove patterns GP may be inclined to be closer to the second direction DR2, which is parallel to the folding axis FX, than the first direction DR1, which is perpendicular to the folding axis FX, when viewed in a plane. Widths WG1 of the groove patterns OP, which are defined in the first direction DR1, may be the same as each other, however, they should not be limited thereto or thereby.

Meanwhile, at least some of the groove patterns GP may cross each other and may be integrally formed with each other. Referring to FIG. 8C, the groove patterns GP may include two or more groove patterns GP1 and GP2 extending in different directions. The groove patterns GP may include first groove patterns GP1 and second groove patterns GP2 extending in a direction to cross the first groove patterns GP1. As an example, the first groove patterns GP1 and the second groove patterns GP2 may extend obliquely in opposite directions at the same angle with respect to the second direction DR2.

The first groove pattern GP1 and the second groove pattern GP2 may cross each other to partially overlap each other. Portions where the first groove pattern GP1 overlaps the second groove pattern GP2 may be integrally formed with each other and may be connected to each other. As an example, the groove patterns GP may include mesh patterns. Accordingly, portions of the upper surface of the substrate SB, which overlap the folding area FA1, may be surrounded by the groove patterns GP to form a closed curve. The folding property of the window WM may be improved by the groove patterns OP including the mesh patterns.

Meanwhile, FIGS. 8A to 8C show the shape of the groove patterns GP when viewed in a plane. The arrangement and the shape of the groove patterns GP in a plane may be changed in various ways as long as they do not depart from the inventive concept of the present disclosure.

Figure 9A:
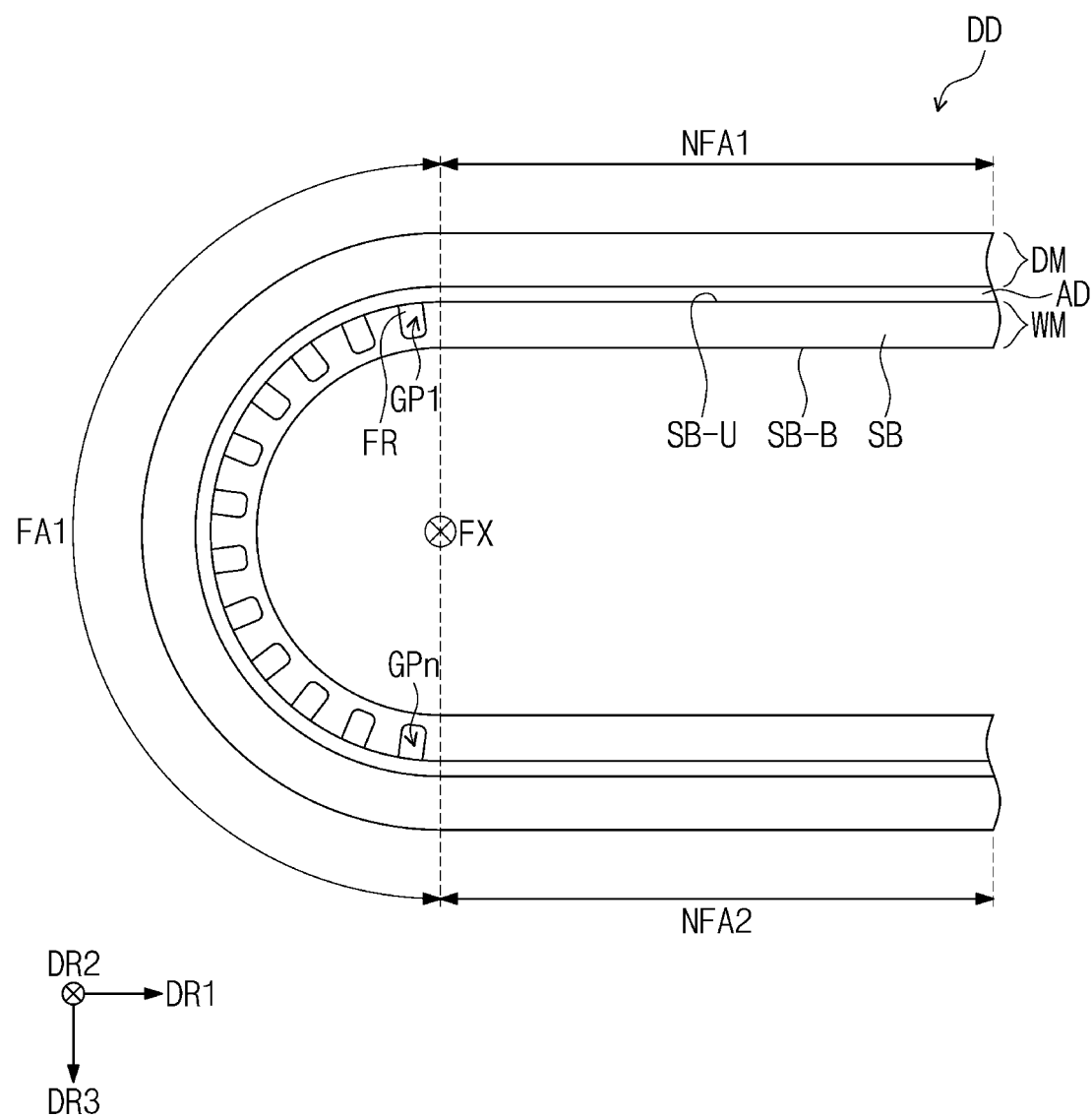
FIGS. 9A to 9C are cross-sectional views showing display devices according to embodiments of the present disclosure.
Figure 9B:
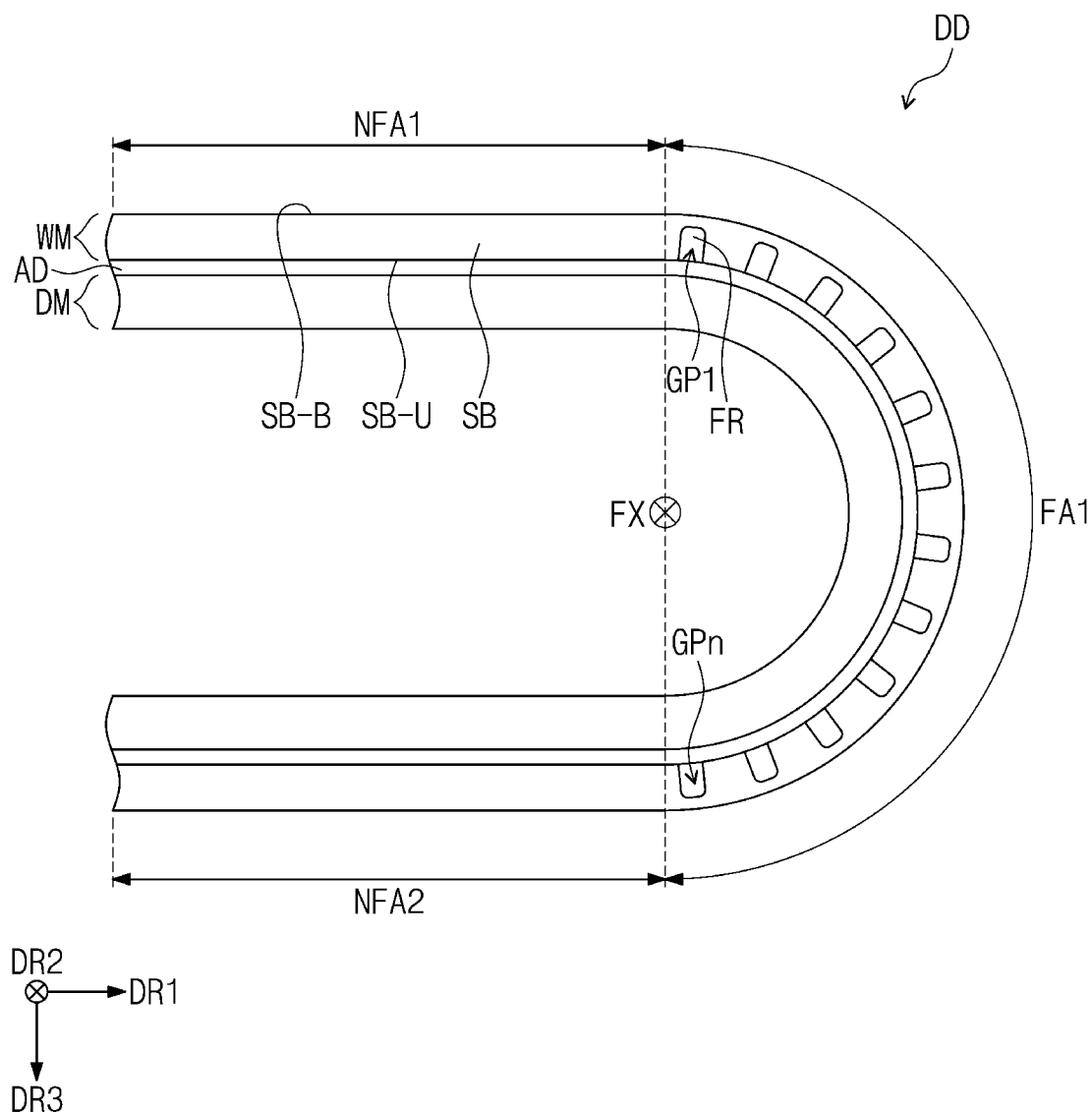
Figure 9C:
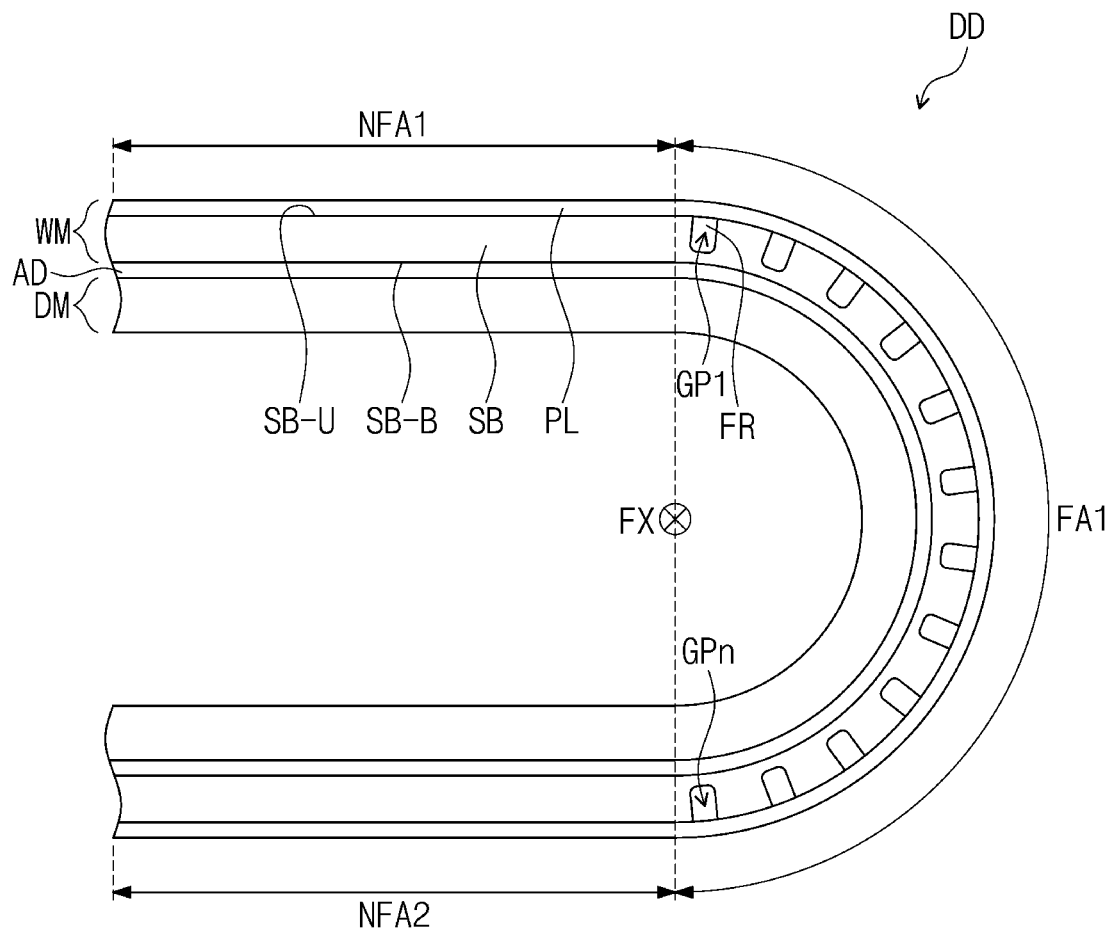

FIGS. 9A to 9C are cross-sectional views showing display devices DD according to embodiments of the present disclosure. FIGS. 9A to 9C are cross-sectional views showing the display devices DD corresponding to a folding area FA1 and a portion of non-folding areas NFA1 and NFA2. Referring to FIGS. 9A to 9C, the display device DD may include a window WM, a display module DM, and an adhesive layer AD. The window WM may include a substrate SB, a plurality of groove patterns GP1 to GPn, and a filling member FR. Details on the configurations described with reference to the above embodiments may be applied to the same configurations in FIGS. 9A to 9C.

The window WM may be applied to a foldable display device DD that enables only one of an in-folding operation and an out-folding operation, however, it should not be limited thereto or thereby. According to an embodiment, the window WM may be used in a display device DD designed to enable both in-folding and out-folding operations in one display device DD.

FIG. 9A shows a cross-section of the display device DD that is inwardly folded to allow display surfaces respectively overlapping a first non-folding area NFA1 and a second non-folding area NFA2 of the display module DM to face each other. This may correspond to the display device DD shown in FIG. 2A. FIG. 9B shows a cross-section of the display device DD that is outwardly folded to allow the display surfaces respectively overlapping the first non-folding area NFA1 and the second non-folding area NFA2 of the display module DM to face the outside in directions opposite to each other. This may correspond to the display device DD shown in FIG. 2B.

Referring to FIGS. 9A and 9B, an upper surface SB-U of the substrate SB may face the display module DM. That is, the window WM may be disposed such that the upper surface SB-U of the substrate SB is disposed more adjacent to the display module DM than a lower surface SB-B is in the third direction DR3.

Referring to FIG. 9A, the lower surface SB-B of the substrate SB may face a folding axis FX in the in-folding state. When the display device DD is folded, the lower surface SB-B of the substrate SB may be folded to surround the folding axis FX. Referring to FIG. 9B, the upper surface SB-U of the substrate SB may face the folding axis FX in the out-folding state. When the display device DD is folded, the upper surface SB-U of the substrate SB may be folded to surround the folding axis FX.

The groove patterns GP1 to GPa and the filling member FR filled in the groove patterns GP1 to GPn may absorb the compressive or tensile stress acting on the window WM when the display device DD is folded, and thus, the folding property of the window WM may be improved. Portions of the substrate SB, which overlap the non-folding areas NFA1 and NFA2, may have a thickness greater than a thickness of portions of the substrate SB, which overlap the groove patterns GP1 to GPn of the folding area FA1. Accordingly, the folding property of the window WM may be improved in the folding area FA1, and substantially simultaneously, the window WM may have the impact resistance to protect the display module DM. As the filling member FR of the window WM is filled in the groove patterns GP1 to GPn, the impact resistance of the window WM in the folding area FA1 may be compensated for.

FIG. 9C shows a cross-section of the display device DD that is outwardly folded (out-folding). In the display device DD outwardly folded, a window WM may be disposed to allow a lower surface SB-B of a substrate SB to face a display module DM. An upper surface SB-U of the substrate SB may face toward the outside. In the out-folding state, the lower surface SB-B of the substrate SB may face a folding axis FX and may surround the folding axis FX while being folded.

The window WM may further include a protective layer PL disposed on the substrate SB. The protective layer PL may be disposed on the upper surface SB-U of the substrate SB to face a plurality of groove patterns GP. The protective layer PL may be provided in the form of a polymer film or may be provided in a coating layer directly formed on the substrate SB to protect the substrate SB, however, it should not be particularly limited.

The protective layer PL may be simultaneously integrally formed with a filling member FR, however, it should not be limited thereto or thereby. According to an embodiment, the protective layer PL may be formed through a separate process after the filling member FR is filled. Although not shown in figures, the protective layer PL may be included in the window WM shown in FIGS. 9A and 9B and may be disposed on the lower surface SB-B of the substrate SB to protect the substrate SB.

When the lower surface SB-B of the substrate SB faces the folding axis FX, the folding property of the window WM may be effectively improved. As an example, when the window WM is folded in the embodiments shown in FIGS. 9A and 9C, the closer to the upper surface SB-U of the substrate SB, the greater the tensile stress, and the closer to the lower surface SB-B of the substrate SB, the greater the compressive stress. The portions of the substrate SB in which the groove patterns GP1 to GPn are defined may absorb the tensile stress better than the portions of the substrate SB in which the groove patterns GP1 to GPn are not defined and may have great flexibility against the tensile stress.

Figure 10:
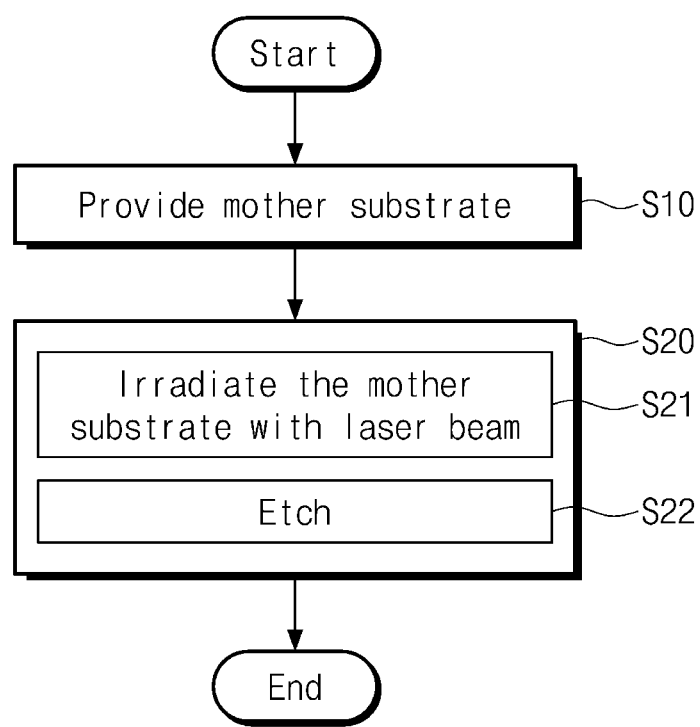
FIG. 10 is a flowchart showing a method of manufacturing a window according to an embodiment of the present disclosure.

FIG. 10 is a flowchart showing a method of manufacturing a window according to an embodiment of the present disclosure. Referring to FIG. 10, the manufacturing method of the window may include providing a mother substrate (S10) and forming groove patterns (S20).

The mother substrate provided in the providing of the mother substrate (S10) may be used to manufacture the window and may correspond to a substrate in which no groove patterns are formed. The mother substrate provided in the providing of the mother substrate (S10) may be a glass substrate that is not tempered or a glass substrate that is tempered according to its manufacturing state. Imaginary lines may be defined in the mother substrate along the direction in which the groove patterns extend.

Then, the groove patterns may be formed in the mother substrate (S20). The forming of the groove patterns (S20) may include irradiating a laser beam (S21) and etching (S22).

The laser beam irradiated in the irradiating of the laser beam (S21) may be irradiated onto an irradiation point to change a refractive index of a portion of the mother substrate. The portion to which the laser beam is irradiated may be phase-transformed by the laser beam, and the refractive index of the portion to which the laser beam is irradiated may be different from a refractive index of a portion of the mother substrate to which the laser beam is not irradiated.

The etching (S22) may include wet-etching to provide an etchant to the portion to which the laser beam is irradiated. As a method of providing the etchant, a spraying method that sprays the etchant to the portion of the mother substrate to which the laser beam is irradiated or a dipping method that dips the mother substrate into the etchant may be used, however, it should not be particularly limited. According to an embodiment, the etchant may include an alkaline solution.

Then, the manufacturing method of the window will be described in detail with reference to accompanying drawings.

Figure 11A:
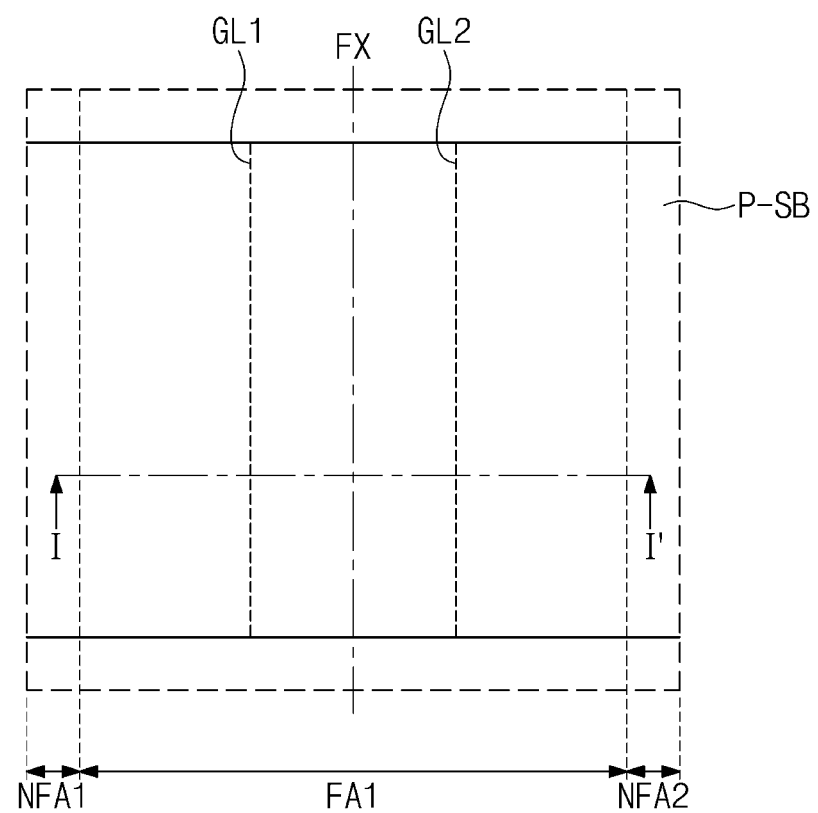
FIG. 11A is a plan view showing a process of a method of manufacturing a window according to an embodiment of the present disclosure.
Figure 11B:
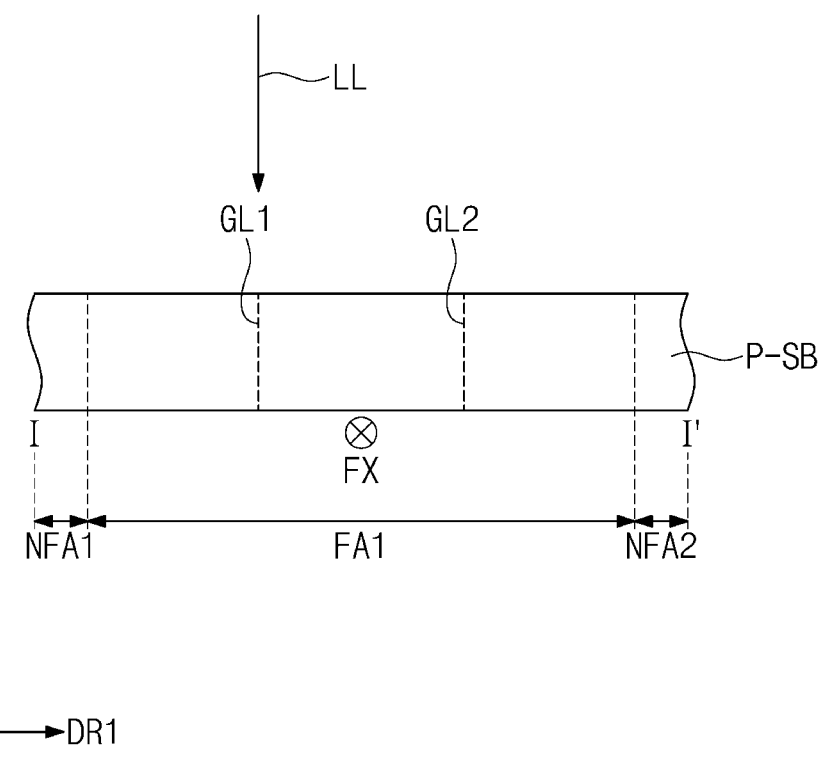
FIG. 11B is a cross-sectional view showing a process of a method of manufacturing a window according to an embodiment of the present disclosure.
Figure 12A:
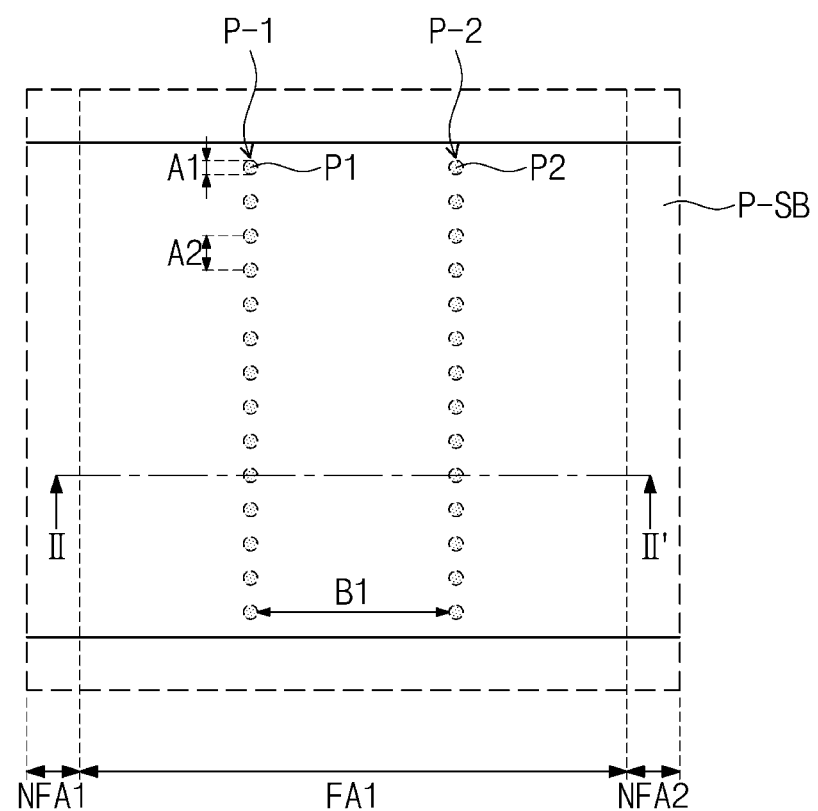
FIG. 12A is a plan view showing a process of a method of manufacturing a window according to an embodiment of the present disclosure.
Figure 12A:
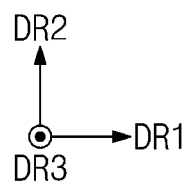
Figure 12B:
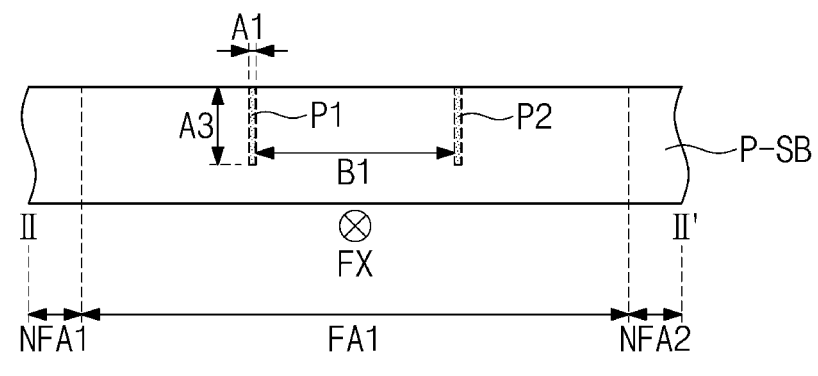
FIG. 12B is a cross-sectional view showing a process of a method of manufacturing a window according to an embodiment of the present disclosure.
Figure 12B:
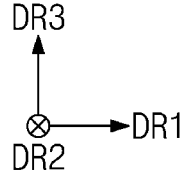
Figure 13A:
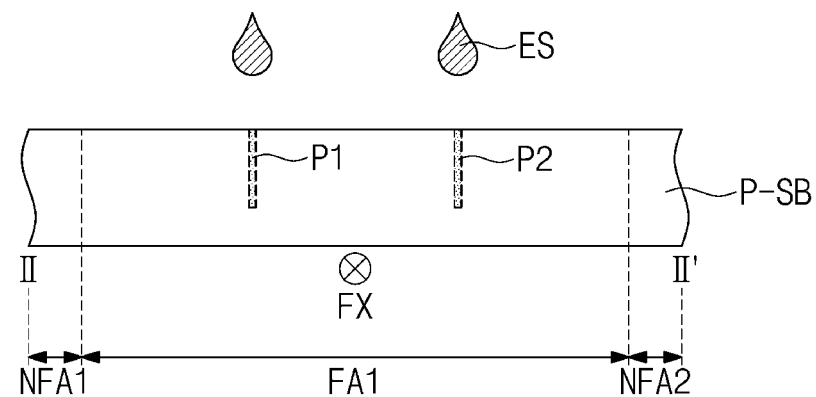
FIGS. 13A to 13C are cross-sectional views showing a process of a method of manufacturing a window according to embodiments of the present disclosure.
Figure 13A:
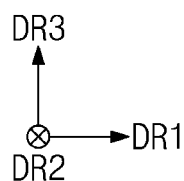
Figure 13B:
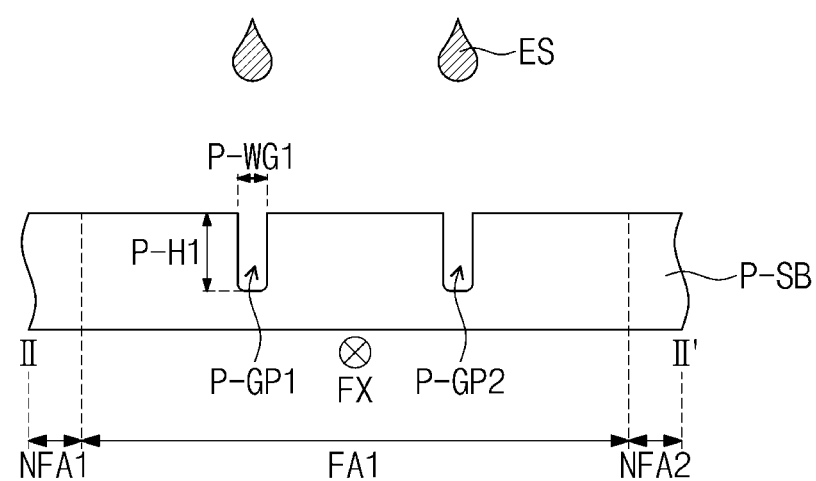
Figure 13B:
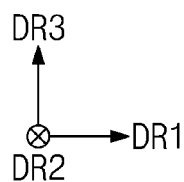
Figure 13C:
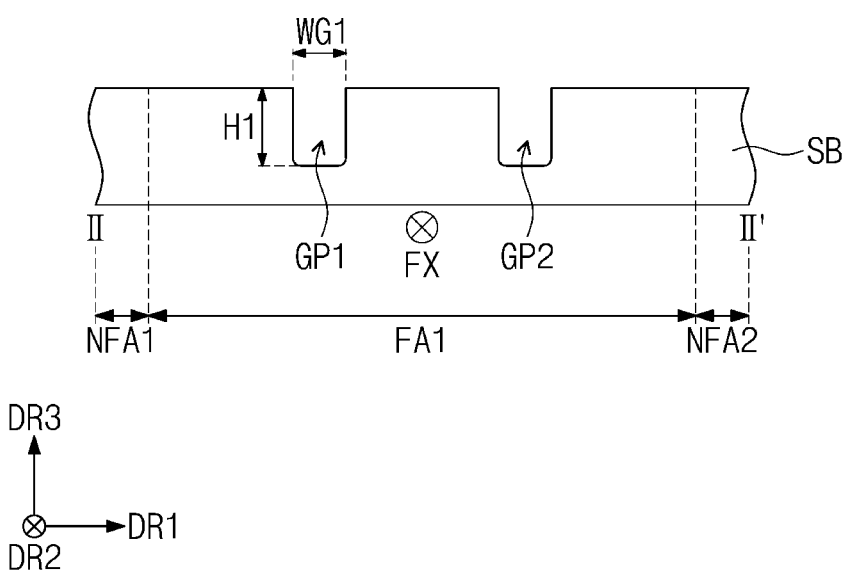

FIGS. 11A and 12A are plan views showing processes of the manufacturing method of the window according to embodiments of the present disclosure. FIGS. 11B and 12B are cross-sectional views showing processes of the manufacturing method of the window according to embodiments of the present disclosure. FIGS. 13A to 13C are cross-sectional views showing processes of the manufacturing method of the window according to embodiments of the present disclosure.

The plan view shown in FIG. 11A corresponds to the providing of the mother substrate (S10) of FIG. 10, and a plan view of the provided mother substrate P-SB is shown as a representative example. Imaginary lines GL1 and GL2 may be defined in the folding area FA1 of the mother substrate P-SB to form the groove patterns. The imaginary lines GL1 and GL2 may correspond to center lines of the groove patterns formed later and may be defined substantially parallel to a direction in which the groove patterns extend.

For the convenience of explanation, FIG. 11A shows the imaginary lines GL1 and GL2 defined to form two groove patterns extending parallel to the folding axis FX as a representative example. The imaginary lines GL1 and GL2 may be defined to respectively correspond to the groove patterns that are to be formed, and the imaginary lines will be referred to as a first line GL1 and a second line GL2, respectively.

FIG. 11B is a cross-sectional view taken along a line I-I' shown in FIG. 11A. The process shown in FIG. 11B may correspond to the irradiating of the laser beam (S21) of FIG. 10.

The laser beam LL may be irradiated on the mother substrate P-SB toward a thickness direction of the mother substrate P-SB. The laser beam LL may be irradiated on a plurality of points to overlap the first and second lines GL1 and GL2.

At the points irradiated with the laser beam LL, a local melting occurs by the laser beam LL, and the phase of the mother substrate P-SB corresponding to the points irradiated with the laser beam LL may be changed. Thus, the refractive index may be changed. The refractive index of the points irradiated with the laser beam LL may be different from the refractive index of the mother substrate P-SB before the laser beam LL is irradiated. The laser beam LL may have an intensity to change the refractive index of a portion of the mother substrate P-SB without cutting the portion of the mother substrate P-SB.

The laser beam LL may have a pulse energy. A pulse duration of the laser beam LL may be in a range from hundreds of picoseconds to tens of femtoseconds. As an example, the pulse duration of the laser beam LL may be equal to or smaller than about 200 picoseconds. The pulse duration of the laser beam LL may vary depending on a material or thickness of the mother substrate P-SB. The laser beam LL may have a wavelength equal to or greater than about 250 nm and equal to or smaller than about 1500 nm, in detail, a wavelength equal to or greater than about 340 nm and equal to or smaller than about 1060 nm.

The laser beam LL may be a non-diffractive beam. As an example, the laser beam LL may be a Bessel beam, however, it should not be limited thereto or thereby. According to an embodiment, the laser beam LL may be a Gaussian beam.

FIG. 12A is a plan view showing the mother substrate P-SB after the irradiation of the laser beam. For the convenience of explanation, portions P1 and P2 irradiated with the laser beam are shown hatched, however, the portions P1 and P2 irradiated with the laser beam are so minute that it may be difficult to identify the portions with naked eyes.

Referring to FIG. 12A, the laser beam LL (refer to FIG. 11B) may be irradiated onto a plurality of portions P1 (hereinafter, referred to as first portions P1) overlapping the first line GL1 and spaced apart from each other in the second direction DR2 to form the first groove pattern. Similarly, the laser beam may be irradiated onto a plurality of portions P2 (hereinafter, referred to as second portions P2) overlapping the second line GL2 and spaced apart from each other in the second direction DR2 to form the second groove pattern. A refractive index of the first portions P1 and the second portions P2 after the irradiation of the laser beam may be different from a refractive index of the mother substrate P-SB before the irradiation of the laser beam. Before the first and second groove patterns are formed, the first portions P1 and the second portions P2 to which the laser beam is irradiated may be respectively defined as a first preliminary pattern P-1 and a second preliminary pattern P-2.

The first portions P1 may be formed to have a predetermined diameter A1 when viewed in a plane. As an example, the diameter A1 of each of the first portions P1 may be equal to or smaller than about 3 μm. The laser beam LL (refer to FIG. 11B) may change the refractive index of the portions without forming a physical hole in the mother substrate P-SB, and a size of the portions where the refractive index is changed is also very small. Accordingly, changes in appearance of the mother substrate P-SB by the laser beam may not be easily seen and may be viewed using a high-magnification microscope.

The first portions P1 may be formed along the second direction DR2 and may be spaced apart from each other by a predetermined distance A2. Similarly, the second portions P2 may be formed along the second direction DR2 and may be spaced apart from each other by a predetermined distance. The distance A2 between the first portions P1 may be several micrometers (μm). As an example, the distance A2 between the first portions P1 may be equal to or smaller than about 5 μm and should not be particularly limited.

The first portions P1 may be spaced apart from the second portions P2 in the first direction DR1 by a predetermined distance B1. A distance between the groove patterns GP1 and GP2 (refer to FIG. 13C) may be changed according to the distance B1 between the first portions P1 and the second portions P2.

The first portions P1 may be formed to be spaced apart from each other, however, the first groove pattern integrally extending along the second direction DR2 may be formed through the etching (S22) described later. Similarly, the second portions P2 may form the second groove pattern that is spaced apart from the first groove pattern GP1 in the first direction DR1 and extends in the second direction DR2 through the etching (S22).

FIG. 12B shows a cross-section of the mother substrate P-SB, which is taken along a line II-II' shown in FIG. 12A after the laser beam is irradiated. For the convenience of explanation, the first portions P1 and the second portions P2 of which the refractive index is changed due to the irradiation of the laser beam are shown hatched in FIG. 12B and subsequent drawings.

Referring to FIG. 12B, each of the first portions P1 and the second portions P2 may have a predetermined thickness in the thickness direction. The thickness A3 of each of the first portions P1 may be smaller than the thickness of the mother substrate P-SB. The thickness A3 of the first portions P1 may be controlled by adjusting the intensity of the laser beam. A depth of the first groove pattern GP1 (refer to FIG. 13C) may be changed depending on the thickness A3 of the first portions P1.

When referring to one first portion among the first portions P1, the first portion is not formed by irradiating the laser beam multiple times onto one point, and the refractive index of the mother substrate P-SB corresponding to the first portion may be changed with one laser beam irradiation, however, the present disclosure should not be limited thereto or thereby.

Descriptions on the first portions P1 may be equally applied to the second portions P2. The second portions P2 may have the same thickness as the thickness A3 of the first portions P1. In this case, a depth of the second groove pattern may be formed to be substantially the same as the depth of the first groove pattern when the etching (S22) is applied to the second groove pattern under the same conditions.

FIGS. 13A to 13C show cross-sectional views taken along a line II-II' shown in FIG. 12A. The process shown in FIGS. 13A to 13C may correspond to the etching (S22) of FIG. 10.

Referring to FIG. 13A, the etchant ES may be provided on the first and second portions P1 and P2. The etchant ES may be provided by the spraying method or the dipping method, however, it should not be particularly limited. The etchant ES may etch a portion of the mother substrate P-SB around the first and second portions P1 and P2.

The etchant ES may include an alkaline solution. As an example, the etchant ES may include a sodium hydroxide (NaOH) solution or a potassium hydroxide (KOH) solution, and preferably, the etchant ES may include the sodium hydroxide solution. As the etchant ES includes the alkaline solution, the groove patterns GP1 and GP2 may be formed to include the bottom surface substantially parallel to the upper surface of the substrate and the side surface including at least one curved surface. When the etchant includes an acid solution such as a hydrogen fluoride solution, a sharp groove pattern pointing downward to the lower surface of the mother substrate P-SB may be formed, and it may be difficult to form the groove pattern in the shape according to the embodiment.

The shape of the groove patterns may be changed depending on an etch rate or an etch amount. As a concentration and a temperature of the etchant ES increase, the etch rate increases. As an exposure time to the etchant ES increases, that is, an etch time increases, the etch amount increases.

In particular, as the temperature of the etchant ES increases, a reactivity of the etchant ES may increase, and thus, the etch rate may be increase. The temperature of the etchant ES may be equal to or higher than a room temperature. As an example, the temperature of the etchant ES may be equal to or higher than about 100 Celsius degrees and equal to or lower than about 150 Celsius degrees. When the temperature of the etchant ES is lower than about 100 Celsius degrees, the reactivity of the etchant ES may be deteriorated, and a process time required to form the groove pattern may increase. When the temperature of the etchant ES is higher than about 150 Celsius degrees, the mother substrate P-SB may be damaged since the mother substrate P-SB is exposed to the high temperature.

FIG. 13B shows the cross-sectional view of the mother substrate P-SB after a certain time elapses since the providing of the etchant ES. FIG. 13C shows the cross-sectional view of the substrate SB in which the groove patterns GP1 and GP2 are formed after the exposure time to the etchant ES is lengthened in the state shown in FIG. 13B.

Referring to FIG. 13B, the mother substrate P-SB may be isotropically etched around the first portions P1 and the second portions P2. The first portions P1 may be etched to form a first recessed portions P-GP1, and the second portions P2 may be etched to form a second recessed portions P-GP2. Due to the etchant ES including the alkaline solution, the first and second recessed portions P-GP1 and P-GP2 may be formed to include the bottom surface substantially parallel to the upper surface of the mother substrate P-SB and at least one curved surface bent from the bottom surface.

The first recessed portion P-GP1 may be formed to have a predetermined width P-WG1 in the first direction DR1 and a predetermined depth P-H1 in the third direction DR3. The first recessed portion P-GP1 may be controlled by the size of the first portions P1, the arrangement of the first portions P1, the etch time in the etching process, or the like. In particular, the width P-WG1 of the first recessed portion P-GP1 may vary depending on the diameter A1 (refer to FIG. 12B) of the first portions P1. The depth P-H1 of the first recessed portion P-GP1 may vary depending on the thickness A3 (refer to FIG. 12B) of the first portions P1. Descriptions on the first recessed portion P-GP1 may be equally applied to the second recessed portion P-GP2.

In a case where the etching (S22) is terminated in the state shown in FIG. 13B, the first recessed portion P-GP1 and the second recessed portion P-GP2 may correspond to the first groove pattern and the second groove pattern, respectively. In a case where the etching (S22) is performed by extending the etch time in the state shown in FIG. 13B, the first groove pattern and the second groove pattern may correspond to the state shown in FIG. 13C.

Referring to FIG. 13C, the groove patterns GP1 and GP2 may be formed by recessing portions of the substrate SB through the irradiating of the laser beam (S21) and the etching (S22). In this case, the substrate SB may correspond to the mother substrate P-SB in which the groove patterns GP1 and GP2 are formed. Descriptions on the groove patterns GP1 and GP2 are the same as those described above.

The first groove pattern GP1 may have the width WG1 and the depth H1. The first recessed portion P-GP1 of FIG. 13B may be further exposed to the etchant ES to be formed as the first groove pattern GP1. The width WG1 of the first groove pattern GP1 may be greater than the width P-WG1 of the first recessed portion P-GP1. In addition, the depth H1 of the first groove pattern GP1 may be greater than the depth P-H1 of the first recessed portion P-GP1. Accordingly, the etch amount may be controlled by adjusting the etch time, and thus, the groove patterns having desired width and depth may be formed. The above descriptions on the first groove pattern GP1 may be applied to the second groove pattern GP2.

The manufacturing method of the window according to the embodiment of the present disclosure may further include forming the groove patterns having different widths according to the shape of the groove patterns included in the window. Hereinafter, processes of forming the groove patterns having different widths from each other will be described in detail with reference to accompanying drawings.

Figure 14:
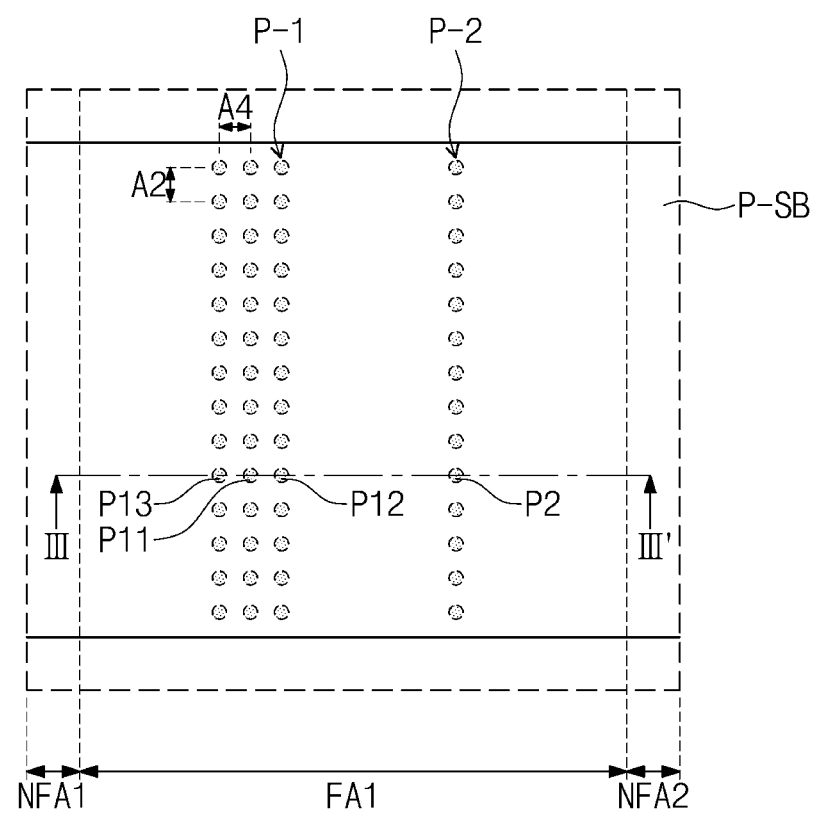
FIG. 14 is a plan view showing a process of a method of manufacturing a window according to an embodiment of the present disclosure.
Figure 14:
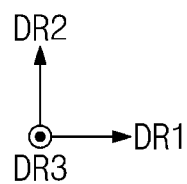
Figure 15A:
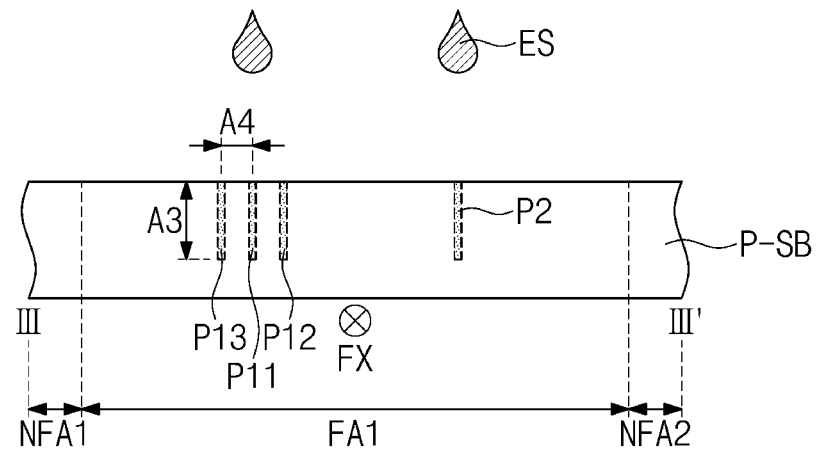
FIGS. 15A and 15B are cross-sectional views showing a process of a method of manufacturing a window according to an embodiment of the present disclosure.
Figure 15B:
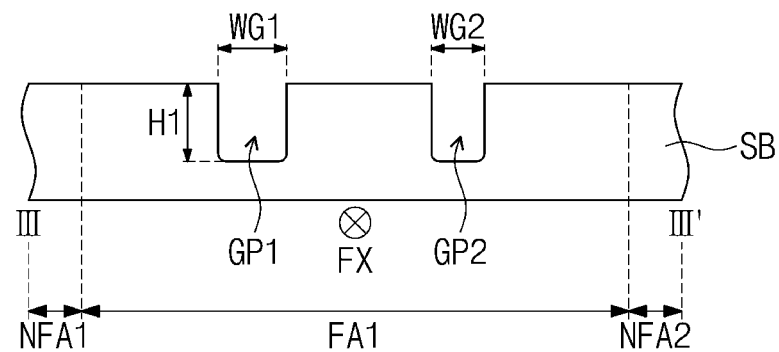
Figure 16A:
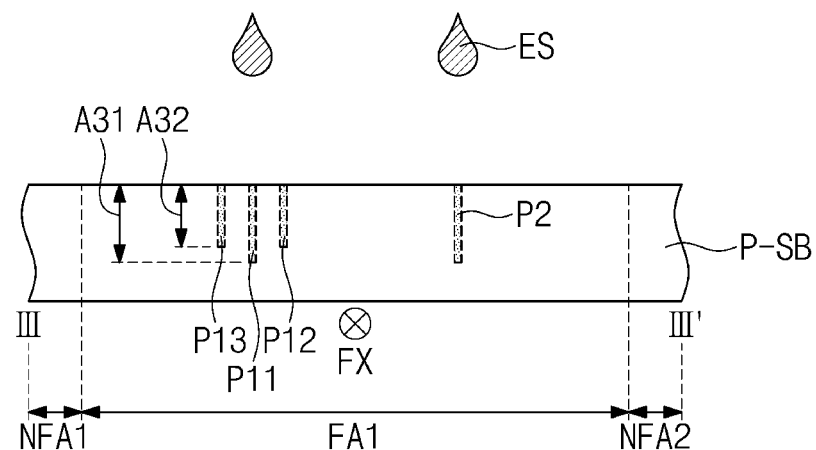
FIGS. 16A and 16B are cross-sectional views showing a process of a method of manufacturing a window according to an embodiment of the present disclosure.
Figure 16A:
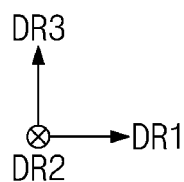
Figure 16B:
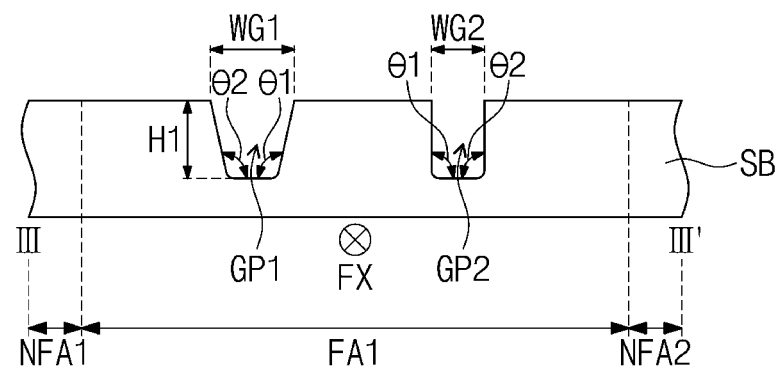
Figure 16B:
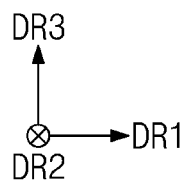
Figure 17A:
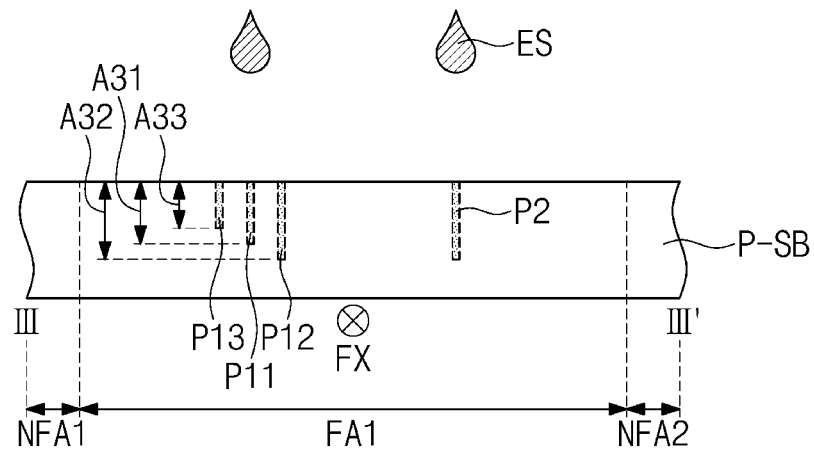
FIGS. 17A and 17B are cross-sectional views showing a process of a method of manufacturing a window according to an embodiment of the present disclosure.
Figure 17A:
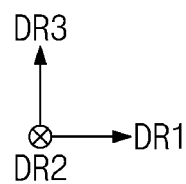

FIG. 14 is a plan view showing a process of the manufacturing method of the window according to an embodiment of the present disclosure. FIGS. 15A, 15B, 16A, 16B, 17A, and 17B are cross-sectional views showing processes of the manufacturing method of the window according to embodiments of the present disclosure. Descriptions on an etchant ES used in the etching (S22) shown in FIGS. 15A, 16A, and 17A are the same as those described above.

FIG. 14 shows the plan view of a mother substrate P-SB after the irradiation of the laser beam to form the groove patterns having different widths from each other. In FIG. 14, portions P11, P12, P13, and P2 to which the laser beam is irradiated are shown hatched.

Referring to FIG. 14, the laser beam may be irradiated onto portions spaced apart from each other in the second direction DR2 to form the second groove pattern, and the second portions P2 may be formed. Descriptions on the forming of the second portions P2 are the same as those described above.

The laser beam may be irradiated onto portions arranged in the first direction DR1 and the second direction DR2 and spaced apart from each other to form the first groove pattern having the width greater than that of the second groove pattern, and first portions P11, P12, and P13 may be formed as shown in FIG. 14. Accordingly, the laser beam may be irradiated to form the first portions P11, P12, and P13, which are arranged in a matrix form along a direction in which the groove pattern extends and a direction in which the width of the groove pattern is defined, and thus, the groove pattern having the greater width is formed.

The first portions P11, P12, and P13 may be formed to be spaced apart from each other by a predetermined distance A4 in the first direction DR1. The distance A4 between the first portions P11, P12, and P13 defined in the first direction DR1 may be several micrometers (μm). The width of the first groove pattern formed around the first portions P11, P12, and P13 may be changed depending on the number of the first portions P11, P12, and P13 formed along the first direction DR1 and the distance A4 between the first portions P11, P12, and P13.

The first portions P11, P12, and P13 are formed to be spaced apart from each other, however, the first portions P11, P12, and P13 are integrally connected along the first direction DR1 and the second direction DR2 through the etching (S22) to form the first groove pattern. Meanwhile, the arrangement of the first portions P11, P12, and P13 shown in FIG. 14 is merely one example and may be changed depending on the shape and the size of the groove pattern.

FIG. 15A is a cross-sectional view taken along a line III-III' shown in FIG. 14 in the etching (S22). FIG. 15B is a cross-sectional view showing the substrate SB after the etching (S22) shown in FIG. 15A is completed.

Referring to FIGS. 15A and 15B, each of the first portions P11, P12, and P13 and the second portions P2 of which the refractive index is changed by the laser beam may have a predetermined thickness along the thickness direction. The first portions P11, P12, and P13 arranged in the first direction DR1 may have substantially the same thickness A3. In this case, as shown in FIG. 15B, the first groove pattern GP1 formed around the first portions P11, P12, and P13 may be formed to allow a slope of a side surface to be substantially perpendicular to a bottom surface.

The width WG1 of the first groove pattern GP1 may vary depending on a diameter of each of the first portions P11, P12, and P13, a distance between the first portions P11, P12, and P13 spaced apart from each other in the first direction DR1, and the number of the first portions P11, P12, and P13 formed in the first direction DR1. The width WG1 of the first groove pattern GP1 formed by the first portions P11, P12, and P13 defined in three columns along the first direction DR1 may be greater than the width WG2 of the second groove pattern GP2 formed by the second portions P2 defined in one column along the first direction DR1.

The second portions P2 may have substantially the same thickness as the thickness A3 of each of the first portions P11, P12, and P13. In this case, the depth of the second groove pattern may be formed to be substantially the same as the depth H1 of the first groove pattern GP1 when the etching (S22) is applied to the second groove pattern under the same conditions.

FIG. 16A is a cross-sectional view taken along a line III-III' shown in FIG. 14A in the etching (S22). FIG. 16B is a cross-sectional view showing the substrate SB after the etching (S22) shown in FIG. 16A is completed.

Referring to FIG. 16A, some portions of the first portions P11, P12, and P13 may have different thicknesses from the other portions of the first portions P11, P12, and P13. The slope of the side surface of the groove pattern may be controlled by adjusting the thickness of each of the first portions P11, P12, and P13. The thickness of each of the first portions P11, P12, and P13 may be controlled by adjusting the intensity of the laser beam. As an example, Among the first portions P11, P12, and P13, first portions P11, which are formed at a center position, may have a first thickness A31, and first portions P12 and P13, which are respectively formed at right and left positions, among the first portions P11, P12, and P13 may have a second thickness A32 smaller than the first thickness A31.

Referring to FIG. 16B, as the first portions P12 and P13 on both sides around the first portions P1 formed at the center position are formed to have a relatively small thickness, the first groove pattern GP1 may be formed to allow the portions of the side surface facing each other to be inclined at an angle greater than about 90 degrees with respect to the bottom surface. As the first portions P12 and P13 on both sides are formed to have the same thickness, the portions of the side surface of the first groove pattern GP1, which face each other, may be inclined at the same angles θ1 and θ2 as each other. This may correspond to the groove pattern GPa described with reference to FIG. 5B.

The angles θ1 and θ2 of the side surface of the first groove pattern GP1 may be different from the angles θ1 and θ2 of the side surface of the second groove pattern GP2. The width WG1 of the first groove pattern GP1 including the side surface inclined at the angle greater than that of the second groove pattern GP2 may be greater than the width WG2 of the second groove pattern GP2.

The thickness of the second portions P2 may be substantially the same as the first thickness A31, which is the greatest thickness among the thicknesses of the first portions P11, P12, and P13. In this case, the depth of the second groove pattern GP2 may be formed to be substantially the same as the depth H1 of the first groove pattern GP1 when the etching (S22) is applied to the second groove pattern under the same conditions.

Figure 17B:
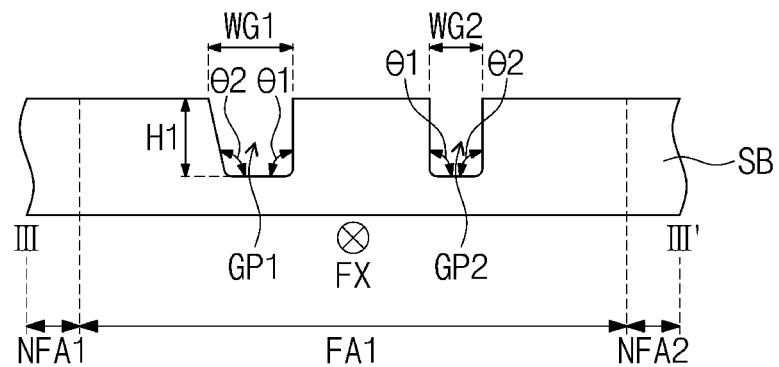
Figure 17B:
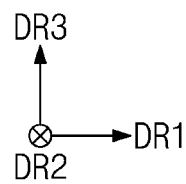

FIG. 17A is a cross-sectional view taken along a line III-III' shown in FIG. 14A in the etching (S22) according to an embodiment. FIG. 17B is a cross-sectional view showing the substrate SB after the etching (S22) shown in FIG. 17A is completed.

Referring to FIG. 17A, some portions of the first portions P11, P12, and P13 may be formed to have different thicknesses from the other portions of the first portions P11, P12, and P13, and the embodiment shown in FIG. 17A has some differences from the embodiment described with reference to FIG. 16A. As an example, the first portions P11, P12, and P13 may respectively have thicknesses A32, A31, and A33 that decrease from right to left. A second thickness A32 of the first portions P12 formed at the rightmost position may be the greatest thickness among the thicknesses of the first portions P11, P12, and P13, and a third thickness A33 of the first portions P13 formed at the leftmost position may be the smallest thickness among the thicknesses of the first portions P11, P12, and P13.

Referring to FIG. 17B, as the thickness of the first portions P11, P12, and P13 is formed to gradually decrease along one direction, the first groove pattern GP1 may be formed to allow the slope of portions of the side surfaces facing each other to be different from each other with respect to the bottom surface. A first surface of the side surface of the first groove pattern GP1 may be inclined at a first angle θ1, a second surface facing the first surface in the first direction DR1 may be inclined at a second angle θ2, and the first angle θ1 and the second angle θ2 may be different from each other. As an example, the first angle θ1 may be substantially the same as about 90 degrees, and the second angle θ2 may be greater than about 90 degrees. This may correspond to the groove pattern GPb described with reference to FIG. 5C. Accordingly, the first angle θ1 and the second angle θ2 of the first groove pattern GP1 may vary depending on the thickness of the first portions P11, P12, and P13.

The angles θ1 and θ2 of the side surface of the first groove pattern GP1 may be the same as or may be different from the angles θ1 and θ2 of the side surface of the second groove pattern GP2. As an example, the first angle θ1 of the first groove pattern GP1 may be substantially the same as the first angle θ1 of the second groove pattern GP2, and the second angle θ2 of the first groove pattern GP1 may be different from the second angle θ2 of the second groove pattern GP2. These may vary depending on the thickness or arrangement of each of the first portions P11, P12, and P13 and the second portions P2.

The width WG1 of the first groove pattern GP1 including the side surface, which is inclined at an angle greater than that of the second groove pattern GP2, may be greater than the width WG2 of the second groove pattern GP2. The thickness of the second portions P2 may be substantially the same as the second thickness A32 that is the greatest thickness of the thicknesses of the first portions P11, P12, and P13. In this case, the depth of the second groove pattern GP2 may be formed to be substantially the same as the depth H1 of the first groove pattern GP1 when the etching (S22) is applied to the second groove pattern under the same conditions.

As the window includes the groove patterns recessed from the upper surface in the folding area, the window may have the impact resistance, and substantially simultaneously the folding property may be improved. The groove patterns may include the bottom surface parallel to the upper surface and the side surface including the curved surface, and thus, the stress caused by the folding operation may be dispersed. As a result, the folding property of the window may be improved.

As the window has the impact resistance, the window may be disposed on the display module and may protect the display module from the external impacts. The window may have the improved folding property, and thus, the display device may be prevented from being damaged due to the repeat folding operation. The window may improve a phenomenon that interference fringes caused by the groove patterns and the pixels of the display module are visually recognized.

According to the manufacturing method of the window, the groove patterns including the bottom surface parallel to the upper surface of the substrate and the side surface including the curved surface may be formed. Accordingly, the window having the improved impact resistance and the improved folding property may be manufactured by the manufacturing method of the window. In addition, the groove patterns including the side surfaces having different slopes may be formed by the manufacturing method of the window, and thus, the window having improved visibility may be manufactured.

Although the embodiments of the present disclosure have been described, is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A window comprising:
a substrate comprising a folding area, a non-folding area, an upper surface, and a lower surface, wherein the folding area is configured to fold about a folding axis extending in a first direction; and
a plurality of groove patterns arranged in the folding area along a second direction crossing the folding axis, wherein each of the plurality of groove patterns extends in a direction inclined with respect to the folding axis extending in the first direction.

2. The window of claim 1, wherein each of the plurality of groove patterns is inclined to be closer to the first direction than to the second direction, when viewed in a plane.

3. The window of claim 1, wherein the thickness of the substrate is equal to or greater than about 30 μm and is equal to or smaller than about 300 μm.

4. The window of claim 1, wherein each of the plurality of groove patterns comprises:
a bottom surface recessed from the upper surface of the substrate and substantially parallel to the upper surface of the substrate; and
a side surface, wherein each side surface of the plurality of groove patterns connects each bottom surface of the plurality of groove patterns to the upper surface of the substrate, and wherein the side surface comprises at least one curved surface.

5. The window of claim 4, wherein each of the side surfaces of the plurality groove patterns, when the substrate is in a non-folded state, comprises:
a first surface; and
a second surface facing the first surface and more spaced apart from the folding axis in the second direction than the first surface is, and
wherein the first surface is inclined at a first angle with respect to the bottom surface, wherein the second surface is inclined at a second angle with respect to the bottom surface, and wherein each of the first angle and the second angle is equal to or greater than about 90 degrees and is equal to or smaller than about 140 degrees.

6. The window of claim 5, wherein the first angles of each of the plurality of groove patterns are substantially the same as each other.

7. The window of claim 5, wherein the second angles of each of the plurality of groove patterns are substantially the same as the first angles respectively facing the second angles.

8. The window of claim 4, wherein thicknesses from the lower surface of the substrate to the bottom surfaces of each of the plurality of groove patterns are the same as each other.

9. The window of claim 4, wherein the bottom surfaces of each of the plurality of groove patterns have a width equal to or greater than about 40 μm.

10. The window of claim 4, wherein at least some groove patterns among the plurality of the groove patterns have different pitches from each other.

11. The window of claim 4, wherein the bottom surfaces of at least some of the groove patterns among the plurality of the groove patterns have different widths from each other.

12. The window of claim 4, wherein the width of the bottom surface gradually decreases as the distance to the folding axis decreases.

13. The window of claim 4, wherein at least some groove patterns among the plurality of the groove patterns have different distances between groove patterns adjacent to each other.

14. The window of claim 4, wherein the distance between groove patterns adjacent to each other among the plurality of groove patterns gradually decreases as the distance to the folding axis decreases.

15. The window of claim 4, wherein the lower surface of the substrate faces the folding axis when the substrate is in a folded state.

16. The window of claim 1, further comprising a filling member disposed in the plurality of groove patterns.

17. A display device comprising:
a display module configured to fold and un-fold; and
a window disposed on the display module and configured to fold and un-fold, wherein the window includes:
a substrate comprising a folding area, a non-folding area, an upper surface, and a lower surface, wherein the folding area is configured to fold about a folding axis extending in a first direction; and
a plurality of groove patterns arranged in the folding area along a second direction crossing the folding axis, wherein each of the plurality of groove patterns extends in a direction inclined with respect to the first direction.

18. The display device of claim 17, wherein each of the plurality of groove patterns is inclined to be closer to the first direction than to the second direction.

19. The window of claim 17, wherein each of the plurality of groove patterns comprises:
a bottom surface recessed from the upper surface of the substrate and substantially parallel to the upper surface of the substrate; and
a side surface, wherein each side surface of the plurality of groove patterns connects each bottom surface of the plurality of groove patterns to the upper surface of the substrate, and wherein the side surface comprises at least one curved surface.

* * * * *